(12) United States Patent
Steiger

(10) Patent No.: US 12,125,695 B2
(45) Date of Patent: Oct. 22, 2024

(54) REDUCING FRETTING CORROSION IN A GAS DISCHARGE CHAMBER SUPPORT DEVICE

(71) Applicant: Cymer, LLC, San Diego, CA (US)

(72) Inventor: Thomas Dickson Steiger, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 287 days.

(21) Appl. No.: 17/795,775

(22) PCT Filed: Jan. 26, 2021

(86) PCT No.: PCT/US2021/015114
§ 371 (c)(1),
(2) Date: Jul. 27, 2022

(87) PCT Pub. No.: WO2021/167760
PCT Pub. Date: Aug. 26, 2021

(65) Prior Publication Data
US 2023/0087803 A1    Mar. 23, 2023

Related U.S. Application Data

(60) Provisional application No. 62/979,522, filed on Feb. 21, 2020.

(51) Int. Cl.
*H01S 3/036*     (2006.01)
*F16C 19/06*     (2006.01)
(Continued)

(52) U.S. Cl.
CPC .............. *H01J 61/30* (2013.01); *F16C 19/06* (2013.01); *F16C 35/04* (2013.01); *H01J 61/025* (2013.01);
(Continued)

(58) Field of Classification Search
CPC .......... H01J 61/30; H01J 61/025; H01J 61/16; H01J 61/52; H01J 61/125; H01J 61/28;
(Continued)

(56) References Cited

U.S. PATENT DOCUMENTS 3,703,635 A * 11/1972 Burkarth ............ G02B 17/0694
362/264
2020/0291949 A1    9/2020 Kim

FOREIGN PATENT DOCUMENTS

CN    208474166 U    2/2019
EP      2860417 A1    4/2015
(Continued)

OTHER PUBLICATIONS

Office Action, counterpart Japanese Patent Application No. 2022-535907, mailed Jul. 11, 2023, 6 pages total (including English translation of 3 pages).
(Continued)

*Primary Examiner* — Donald L Raleigh
(74) *Attorney, Agent, or Firm* — DiBerardino McGovern IP Group LLC

(57) ABSTRACT

A light source apparatus (100) includes: a chamber (101) having a chamber wall (103) defining an opening (107); and a support apparatus (110) including a support device (111) positioned within the opening of the chamber wall. The support device includes: a cup (112) having an inner surface (114) configured to retain a movable apparatus and an outer surface (116) having a first outer diameter; and a plurality of rods (118) arranged at the outer surface of the cup such that the arrangement of the plurality of rods defines a second outer diameter, the second outer diameter greater than the first outer diameter. The chamber wall is configured to hold the support device such that the chamber wall contacts the plurality of rods when the support device is positioned
(Continued)

within the opening of the chamber wall, and the outer surface of the cup does not contact the chamber wall.

33 Claims, 11 Drawing Sheets

(51) Int. Cl.
  *F16C 35/04* (2006.01)
  *H01J 61/02* (2006.01)
  *H01J 61/16* (2006.01)
  *H01J 61/30* (2006.01)
  *H01J 61/52* (2006.01)
  *H01S 3/225* (2006.01)

(52) U.S. Cl.
  CPC .............. *H01J 61/16* (2013.01); *H01J 61/52* (2013.01); *H01S 3/036* (2013.01); *H01S 3/225* (2013.01)

(58) Field of Classification Search
  CPC ...... F16C 19/06; F16C 35/04; F16C 2362/00; H01S 3/036; H01S 3/225; H01S 3/2366
  See application file for complete search history.

(56) References Cited

FOREIGN PATENT DOCUMENTS

| | | |
|---|---|---|
| JP | H04142787 A | 5/1992 |
| JP | 2010272669 A | 12/2010 |
| JP | 2013069533 A | 4/2013 |
| JP | 2013253682 A | 12/2013 |
| TW | 201322868 A | 6/2013 |
| WO | 2019112245 A1 | 6/2019 |

OTHER PUBLICATIONS

Thomas Lang, European International Searching Authority, International Search Report and Written Opinion, counterpart PCT Application No. PCT/US2021/015114, mailed Jul. 1, 2021, 23 pages.

"Fretting, fretting corrosion and fretting mechanisms," by TriboNet at https://www.tribonet.org/wiki/fretting-corrosion/, Oct. 28, 2018, 6 pages.

"Fretting corrosion in biomedical implants," by J. Geringer, et al., in Tribocorrosion of Passive Metals and Coatings, Jul. 23, 2011, 24 pages.

* cited by examiner

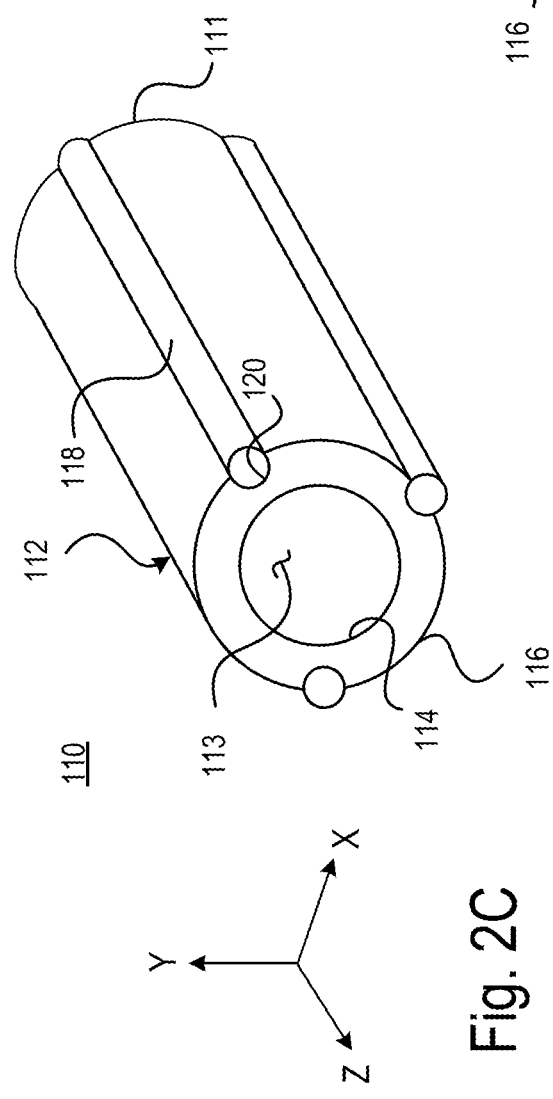
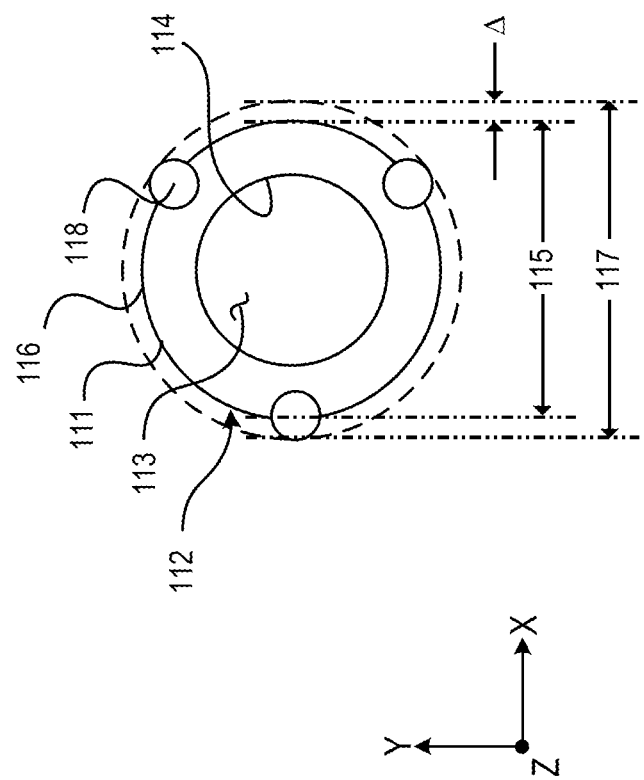
Fig. 2C
Fig. 2D

REDUCING FRETTING CORROSION IN A GAS DISCHARGE CHAMBER SUPPORT DEVICE

CROSS-REFERENCE TO RELATED APPLICATIONS

This application claims priority of U.S. application 62/979,522, which was filed on 21 Feb. 2020 and titled REDUCING CORROSION IN A GAS DISCHARGE CHAMBER SUPPORT DEVICE, which is incorporated herein in its entirety by reference.

TECHNICAL FIELD

The disclosure subject matter relates to a support device in a wall of a gas discharge chamber, the support device configured to support a bearing and being designed to reduce corrosion between the support device and the gas discharge chamber wall.

BACKGROUND

Excimer light sources can be used to supply a light beam to a lithography exposure apparatus. The light beam produced from the excimer light source can have an ultraviolet (UV) wavelength, such as a deep ultraviolet (DUV) wavelength. An excimer light source can be built using a single gas discharge chamber or using a plurality of gas discharge chambers.

The body of the gas discharge chamber can be any shape and configured to house, within its cavity a gas mixture that includes a gain medium. Optical amplification occurs in the gain medium when enough energy is provided by an energy source (which can include electrodes within the cavity of the body). The gas mixture can be any suitable gas mixture configured to produce a light beam (or a laser beam) around the required wavelengths and bandwidth. For example, the gas mixture can include argon fluoride (ArF), which emits light at a wavelength of about 193 nm, or krypton fluoride (KrF), which emits light at a wavelength of about 248 nm. Moreover, an optical feedback mechanism can be arranged or configured relative to the body to provide an optical resonator. The body of the gas discharge chamber can also house a rotatable fan that circulates the gas mixture between the electrodes.

SUMMARY

In some general aspects, a light source apparatus includes: a chamber having a chamber wall defining an opening; and a support apparatus including a support device positioned within the opening of the chamber wall. The support device includes: a cup having an inner surface configured to retain a movable apparatus and an outer surface having a first outer diameter; and a plurality of rods arranged at the outer surface of the cup such that the arrangement of the plurality of rods defines a second outer diameter, the second outer diameter greater than the first outer diameter. The chamber wall is configured to hold the support device such that the chamber wall contacts the plurality of rods when the support device is positioned within the opening of the chamber wall, and the outer surface of the cup does not contact the chamber wall.

Implementations can include one or more of the following features. For example, the movable apparatus can include a bearing configured to be retained within the inner surface of the cup. The bearing can be a ball bearing. The bearing can be configured to receive a post of a rotatable fan. The opening of the chamber wall can be cylindrical in shape, and the axis of rotation of the fan can be parallel with the axis of the opening. The movable apparatus can include a rotatable fan.

The outer surface of the cup can include a plurality of longitudinally-extending holes, each of the holes configured to receive a respective one of the plurality of rods.

The plurality of rods can include three rods, each rod placed 120 degrees from each of the other rods about the outer surface of the cup. Each of the plurality of rods can be made of hardened, polished steel.

The support device can be configured to freely move in a first direction within the opening of the chamber wall, the first direction parallel to an axis of the opening.

Particles can be generated by a frictional engagement due to the contact between the plurality of rods of the support device and the chamber wall, and the generated particles can move away from the region between the plurality of rods and the chamber wall and exist within the opening of the chamber wall between the chamber wall and the outer surface of the cup. A distance between the first outer diameter of the outer surface of the cup and the second outer diameter defined by the plurality of rods can be greater than a diameter of each of the particles. The distance between the first outer diameter and the second outer diameter can be within a range of about 100 to about 4000 micrometers.

The opening can be cylindrically shaped and the support device can be configured to freely move in a direction within the opening that is parallel to an axis of the opening.

The support apparatus can include a constrained support device fixed within an opening of another chamber wall of the chamber. The constrained support device can include a second cup having an inner surface configured to retain the movable apparatus and an outer surface. The opening of the other chamber wall can be configured to hold the second cup such that the other chamber wall contacts the outer surface of the second cup when the second cup is positioned within the second opening of the second chamber wall.

Each of the plurality of rods can be constrained to the outer surface of the cup. Each of the plurality of rods can be constrained to the outer surface by one of press fitting and thermally fitting each rod to the outer surface.

In other general aspects, an ultraviolet light source includes: a light generation apparatus including at least one discharge chamber configured to hold a gaseous gain medium and to produce a light beam, each of the at least one discharge chambers having chamber walls that define an interior cavity; and a support apparatus. The support apparatus includes a partially-constrained support device associated with a discharge chamber and is positioned within an opening of one of the chamber walls of the discharge chamber. The partially-constrained support device includes: a cup having an inner surface configured to retain a movable apparatus and an outer surface having a first outer diameter; and a plurality of rods arranged at the outer surface of the cup such that the arrangement of the plurality of rods defines a second outer diameter, the second outer diameter greater than the first outer diameter. An inner surface of the opening of the chamber wall contacts the plurality of rods of the partially-constrained support device when the partially-constrained support device is positioned within the opening. The outer surface of the cup of the partially-constrained support device does not contact the inner surface of the opening of the chamber wall.

Implementations can include one or more of the following features. For example, the support apparatus can also include a fully-constrained support device having a second cup. The second cup can include an inner surface configured to retain the movable apparatus and an outer surface. The fully-constrained support device can be positioned within an opening of a second chamber wall of the discharge chamber such that the outer surface of the fully-constrained support device contacts an inner surface of the opening of the second chamber wall. The chamber wall having the partially-constrained support device can be positioned opposite to the second chamber wall such that the opening of the chamber wall having the partially-constrained support device is symmetrically placed from the second opening on the second chamber wall. The movable apparatus can include a fan, the fan configured to rotate about an axis of rotation of the fan. The fully-constrained support device can be fixed within the second opening of the second chamber wall and the partially-constrained support device can be configured to move along the axis of rotation of the fan within the opening of the chamber wall that holds the partially-constrained support device.

The chamber walls of the discharge chamber can be sealable such that, in operation, the interior cavity is hermetically sealed.

The light source can include one or more optical components defining an optical pathway, at least part of the optical pathway passing through the discharge chamber. The discharge chamber can contain a gas mixture within the interior cavity, the gas mixture including a gain medium, and an energy source configured to supply energy to the gain medium. The optical components can include a set of optical elements that form an optical resonator.

The light source can also include another support apparatus associated with another discharge chamber of the light generation apparatus, the other support apparatus configured to hold a movable apparatus extending into the interior cavity of the other discharge chamber. The other support apparatus can include a partially-constrained support device positioned within an opening of a first chamber wall of the other discharge chamber and a fully-constrained support device fixed within an opening of a second chamber wall of the other discharge chamber.

In other general aspects, a method of reducing corrosion in a rotary bearing of a light source apparatus is described. The method includes frictionally engaging a support device within a cylindrically-shaped opening of a wall of a gas discharge chamber such that a plurality of axially-extending rods of the support device are contacting an inner surface of the wall opening while a cup of the support device around which the plurality of rods are arranged and retained is not in contact with the inner surface of the wall opening. The method further includes retaining a rotary bearing within an inner surface of the cup, the rotary bearing having a bearing axis aligned with the axis of the wall opening; and engaging a post of a rotatable element that extends into an interior a chamber through the rotary bearing such that the post is constrained to rotate about the bearing axis. Particles generated from the frictional engagement between the rods and the inner surface of the wall opening exit the space between the rods and the inner surface of the wall opening and enter a volume between an outer surface of the cup and the inner surface of the wall opening.

In further general aspects, a light source includes: a discharge chamber configured to hold a gaseous gain medium and to produce a light beam, the discharge chamber including chamber walls that define an interior cavity, at least one window being fixed to at least one chamber wall; a rotatable fan extending through the interior cavity, the rotatable fan configured to circulate the gaseous gain medium within the interior cavity and, in use, the rotatable fan rotating about a fan axis; and a support apparatus configured to hold the rotatable fan. The support apparatus includes: a partially-constrained support device positioned within an opening of a first support chamber wall and receiving a first end of the rotatable fan, the partially-constrained support device able to move along the fan axis; and a fully-constrained support device fixed within an opening of a second support chamber wall that is opposite the first support chamber wall and receiving a second end of the rotatable fan.

Implementations can include one or more of the following features. For example, the partially-constrained support device can include: a cup having an inner surface configured to retain a bearing and an outer surface having a first outer diameter; and a plurality of rods arranged at the outer surface of the cup such that the arrangement of the plurality of rods defines a second outer diameter, the second outer diameter greater than the first outer diameter. An inner surface of the opening of the first support chamber wall contacts the plurality of rods when the partially-constrained support device is positioned within the opening of the first support chamber wall, and the outer surface of the cup does not contact the inner surface of the opening of the first support chamber wall.

The fully-constrained support device can include a second cup. The second cup can include an inner surface configured to retain a bearing and an outer surface. The fully-constrained support device can be positioned within the opening of a second support chamber wall such that the outer surface of the fully-constrained support device contacts an inner surface of the opening of the second support chamber wall.

In other general aspects, a light source apparatus includes: a chamber having a chamber wall defining an opening; and a support apparatus including a support device positioned within the opening of the chamber wall. The support device defines an inner surface configured to retain a bearing and an outer surface having a first outer diameter and a plurality of raised ridges arranged at the outer surface such that the arrangement of the raised edges defines a second outer diameter. The second outer diameter is greater than the first outer diameter and a surface area of the raised edges is smaller than a surface area of the outer surface. The chamber wall is configured to hold the support device such that the chamber wall contacts the raised edges when the support device is positioned within the opening of the chamber wall, and the outer surface does not contact the chamber wall.

Implementations can include one or more of the following features. For example, each raised edge can be formed from an elongated rod that is constrained to the outer surface of the support device. Each of the plurality of raised ridges can be made of a hardened material that can be a hardened, polished steel.

DESCRIPTION OF DRAWINGS

FIG. 2C is a perspective view of the support device that includes a cup and a plurality of rods arranged at an outer surface of the cup.

FIG. 2D is a cross-sectional view taken in the X-Y plane of the support device of FIG. 2C.

DESCRIPTION

Figure 4:
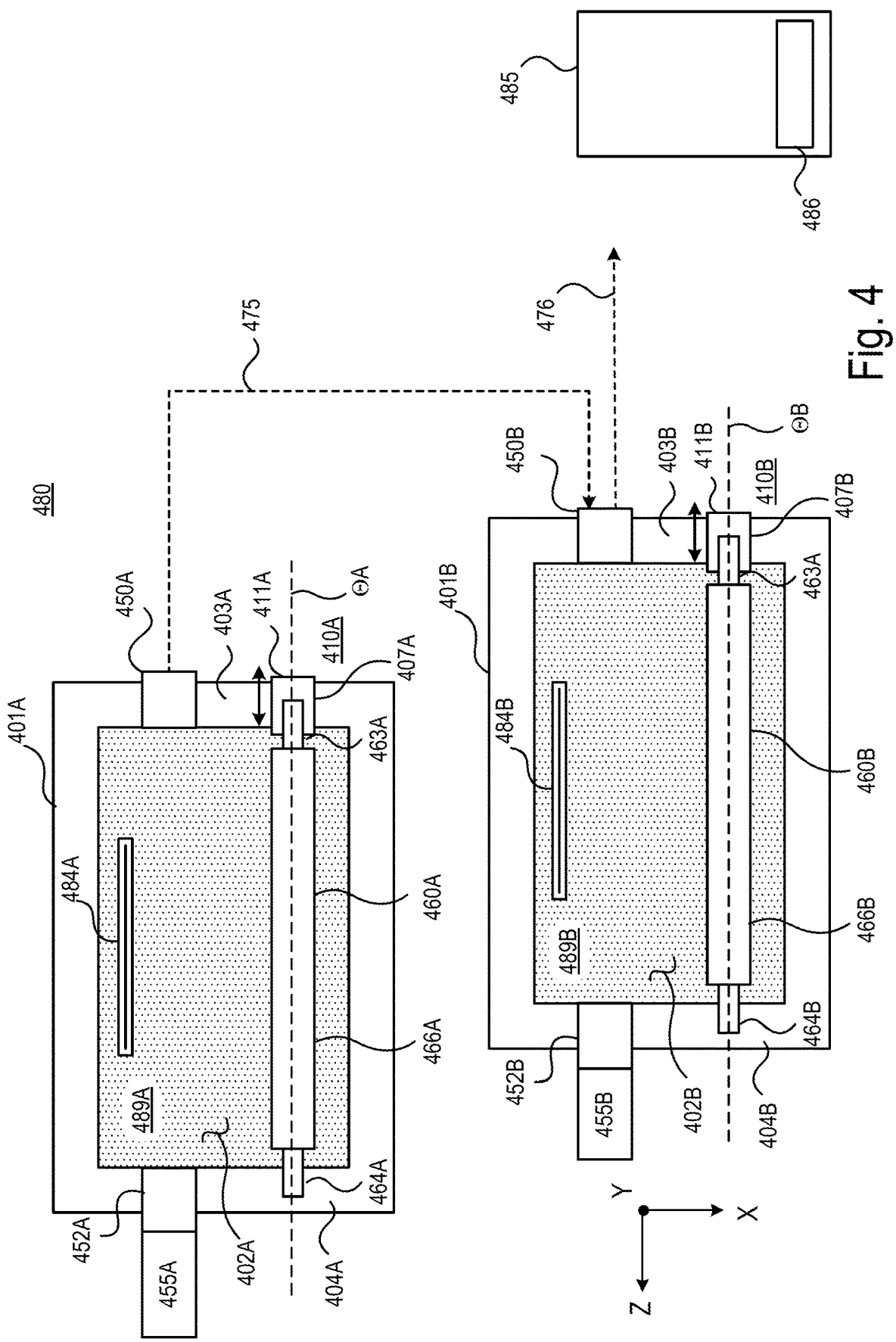
FIG. 4 is a cross-sectional view in the X-Z plan of an ultraviolet light source including two chambers each including chamber walls that define an interior cavity, a partially-constrained support device, and a rotatable fan supported by the partially-constrained support device.

Referring to FIGS. 1A-1D, a light source apparatus 100 includes a chamber 101 defining an interior cavity 102 and a support apparatus 110 arranged within an opening 107 of a wall 103 of the chamber 101. The light source apparatus 100 is configured to be a part of a gas discharge system, such as the gas discharge system 480 that supplies a pulsed light beam 476, as shown in FIG. 4. The support apparatus 110 includes at least one support device 111 configured to hold and support a movable apparatus 160 received within the support device 111. The movable apparatus 160 extends into the cavity 102 of the chamber 101.

The movable apparatus 160 is any component or element that can move relative to the wall 103 of the chamber in any manner that can lead to unwanted frictional engagement between the outer surface of the support device 111 and an inner surface 108 of the opening 107 of the wall 103.

In some implementations, as discussed herein, the movable apparatus 160 is a rotatable fan (such as rotatable fan 360 shown in FIG. 3) that extends within or through the cavity 102. In such implementations, the rotatable fan 360 can be supported within the support device 111 by way of a bearing (such as a bearing 162 shown in FIG. 1D).

During operation of the movable apparatus 160 and the chamber 101, it is possible for vibrations to arise. Such vibrations can cause the support device 111 to move in a manner (such as, for example, along the longitudinal direction that is parallel to an axis of rotation of the movable apparatus 160) that causes unwanted frictional engagement between the outer surface of the support device 111 and the inner surface 108 of the opening 107 of the wall 103 of the chamber 101. This unwanted frictional engagement can result in fretting corrosion, which is a deterioration of material at the interface between the support device 111 and the wall 103 due to small oscillatory movements that arise between them. This fretting or rubbing action results in fine particle fragments being abraded from one or both of the materials of the support device 111 and the wall 103. Moreover, these fragments can then oxidize into hard and abrasive particles, which can further wear and destroy the surface of either or both of the support device 111 and the wall 103. The scratching and abrasion of the metal by the hardened and oxidized particles can cause a loss in dimensional tolerance between the support device 111 and the wall 103, which can cause increased vibrations of the support device 111 within the chamber wall 103. Increased vibrations can lead to instabilities in the entire chamber 101 and unwanted instabilities in the spectral features of the light beam (such as light beam 476) produced within the chamber 101. Further, when the abraded hard and oxidized particles accumulate in the region between the support device 111 and the wall 103, the bearing 162 or movable apparatus 160 that is supported can lose its preload, and this can ultimately lead to catastrophic failure of the bearing 162. This can then lead to the entire chamber 101 ceasing to function.

As a further example, the chamber 101 can be a gas discharge chamber that houses a gas mixture. The gas mixture can include a fluoride component such as argon fluoride or krypton fluoride. Material can be abraded from the surface of either or both of the support device 111 and the wall 103, generating particle fragments. If the support device 111 is made of a nickel alloy and the chamber wall 103 is made of a nickel-plated metal, the particle fragments can be metal fragments that include nickel. As such, particles of metal fluoride (such as nickel fluoride) can be formed from the abraded metal fragments of the support device 111 and/or the chamber wall 103 and the fluoride component of the gas mixture inside the chamber 101. Particles of metal fluoride can enter the region or interface between the wall 103 and the support device 111, and these metal fluoride particles can oxidize or harden and form gritty and abrasive particles.

Accordingly, as discussed herein, the interface between the support device 111 and the wall 103 of the chamber 101 is designed in a manner that reduces fretting corrosion at the contact interface between the support device 111 and the wall 103. First, at least one of the engaging surfaces is made of a hardened material (such as hardened steel). Second, the area of engagement at the interface is substantially reduced; that is, the contact interface between the support device 111 and the wall 103 is restricted. In prior designs, the outer surface of the support device would have a cylindrical shape and the inner surface 108 of opening 107 of the wall 103 would have a cylindrical shape so that the area of engagement was 100% or close to 100% of the total surface area of the outer surface of the support device or the total surface area of the wall 103. In the new design, this contact interface is substantially less. Third, because the surface area of the contact between the support device 111 and the wall 103 is restricted or limited, any particles that are generated at that smaller contact interface are free to fall away from or to be directed away from the contact interface rather than being trapped between the contacting surfaces, thus reducing the scratching and abrasion that can occur from the hardened and oxidized particles. Details are provided next.

Referring again to FIGS. 1A-1D, the chamber 101 includes a plurality of walls that define the interior cavity 102, including the chamber wall 103 that defines the opening 107. The opening 107 can be a cylindrically-shaped region that extends along a longitudinal direction that is aligned with the Z direction through the chamber wall 103. The opening 107 is configured to hold and partially constrain the motion of the support device 111 while the support device 111 is positioned within the opening 107 of the chamber wall 103.

The support device 111 includes a cup 112 and a plurality of rods 118. The cup 112 includes a cylindrical structure that extends longitudinally along the Z direction when inserted and held within the opening 107 of the wall 103. The cylindrical structure of the cup 112 defines an outer surface 116 of the cup 112. The cup 112 also includes a cylindrical hollow region or opening 113 that extends along the longitudinal axis of the cup 112. The opening 113 defines an inner surface 114 of the cup 112 that is configured to hold the bearing 162. The cup 112 can be made of a rigid material such as, for example, a nickel alloy. Nickel alloys include a composition of nickel, copper, and small amounts of iron, manganese, carbon, and silicon. For example, the cup 112 can be made of Monel.

Each of the plurality of rods 118 includes a cylindrical structure that extends along the Z direction such that the length of each rod 118 is approximately equal to the length of the cup 112 along the longitudinal axis of the cup 112. Each of the plurality of rods 118 is arranged at the outer surface 116 of the cup 112 such that each of the rods 118 extends radially beyond the outer surface 116. In this way, when the support device 111 is positioned within the opening 107 of the chamber wall 103, an outer surface of each of the plurality of rods 118 contacts the chamber wall 103 while the outer surface 116 of the cup 112 does not contact the chamber wall 103. Each of the plurality of rods 118 can be made of a hardened material such as, for example, a hardened, polished steel.

During operation, the bearing 162 is retained within the inner surface 114 of the cup 112. The inner surface 114 of the cup 112 can have a diameter that is slightly smaller than a diameter of an outer surface of the bearing 162. For example, the cup 112 can be heated such that the cup 112 expands by thermal expansion, increasing the diameter of the inner surface 114 of the cup 112 to a diameter that is slightly greater than the diameter of the outer surface of the bearing 162. Accordingly, the bearing 162 can be placed within the inner surface 114 of the cup 112 while the inner surface 114 of the cup 112 is thermally expanded. When the cup 112 is cooled, the diameter of the inner surface 114 of the cup 112 decreases and the cup 112 tightly clamps the bearing 162 in place within the inner surface 114 of the cup 112. The bearing 162 is made of one or more rigid parts that work to constrain relative motion of the movable apparatus 160 to only a desired motion. Moreover, the bearing 162 is a device that reduces friction between the movable apparatus 160 and the chamber wall 103. In some implementations, the bearing 162 can provide for free linear movement of the movable apparatus 160 along the Z direction. In other implementations, the bearing 162 enables the movable apparatus 160 to freely rotate around an axis of rotation $\ominus$ that is parallel with a longitudinal axis of the opening 107 of the chamber wall 103. In some implementations, the bearing 162 is a rotary bearing that holds the movable apparatus 160 and enables rotation of the movable apparatus 160 about the axis of rotation $\ominus$. The bearing 162 can be a plain bearing, a ball bearing, or a roller bearing, and it can utilize one or more lubricants.

In some implementations, the bearing 162 is not included and the movable apparatus 160 is retained directly within the inner surface 114 of the cup 112. In these implementations, the movable apparatus 160 can be any apparatus whose motion causes unwanted frictional engagement between the cup 112 and the inner surface 108 of the chamber wall 103.

Figure 3:
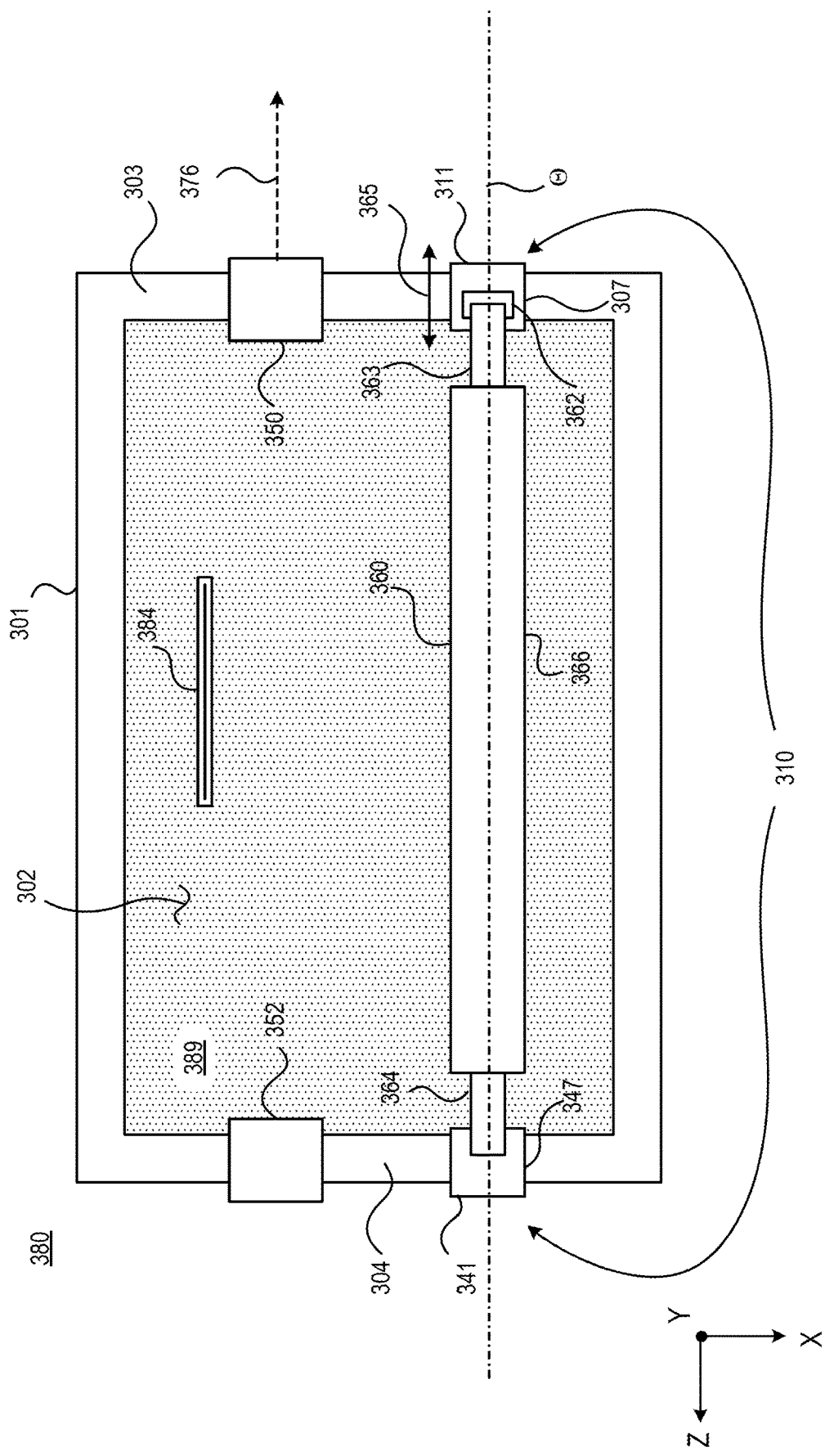
FIG. 3 is a cross-sectional view in the X-Z plane of a light source including a chamber having chamber walls that define an interior cavity, a support apparatus arranged within openings of the chamber walls, and a rotatable fan supported by the support apparatus.

The bearing 162 is supported by the support device 111, and holds the movable apparatus 160 that extends into the interior cavity 102 of the chamber 101. For example, as shown in FIG. 3, a bearing 362 holds the rotatable fan 360 within an interior cavity 302 of a chamber 301 such that the bearing 362 and the rotatable fan 360 are supported by support device 311 and the fan 360 is free to rotate about the axis of rotation $\ominus$.

With reference also to FIGS. 2A-2D, the support device 111 can move freely along the Z direction (which is aligned with the axis of rotation $\ominus$) within and relative to the chamber wall 103. As discussed above, during operation of the movable apparatus 160 and the chamber 101, vibrations can cause the support device 111 to move along the Z direction. When the support device 111 moves in the Z direction, the contact between the plurality of rods 118 and the chamber wall 103 results in frictional engagement between the plurality of rods 118 and the inner surface 108 of the chamber wall 103 that defines the opening 107. As such, the movement of the support device 111 within the chamber wall 103 can cause fretting corrosion of the surface material of the plurality of rods 118 that directly contacts the chamber wall 103. Corrosion of the surface material includes particles of the surface material being generated by the frictional engagement between the support device 111 and the chamber wall 103. Because of the design of the support device 111, any particles that are generated at the interface between the support device 111 and the chamber wall 103 are able to fall away from or be directed away from the region between the plurality of rods 118 and the chamber wall 103. Such particles can remain within the opening 107 between the inner surface 108 of the chamber wall 103 and the outer surface 116 of the cup 112 or can fall away from the opening 107.

Figure 1A:
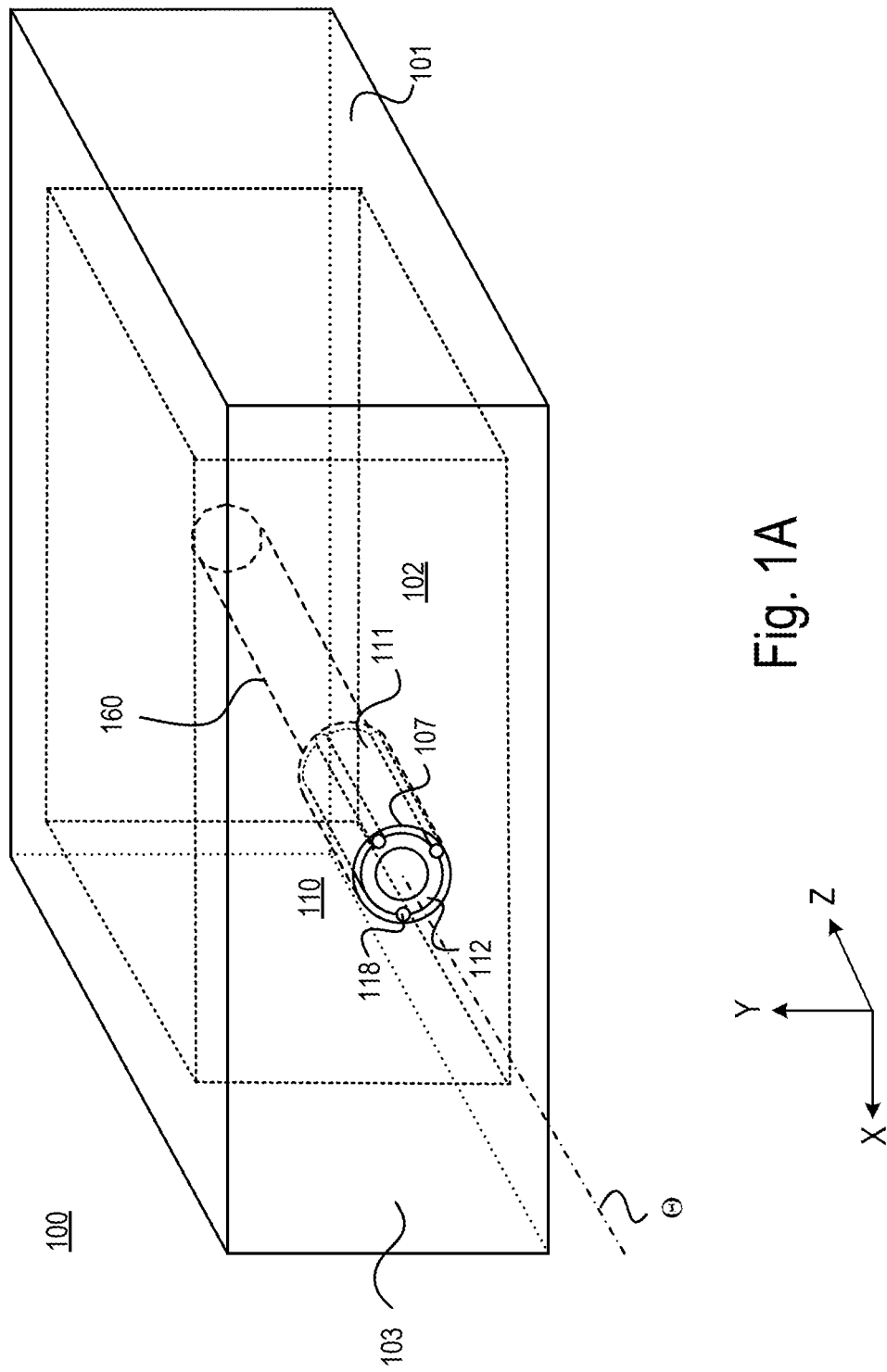
FIG. 1A is a perspective view of a light source apparatus including a chamber having walls that define an interior cavity and a support device arranged within an opening of a chamber wall.
Figure 1B:
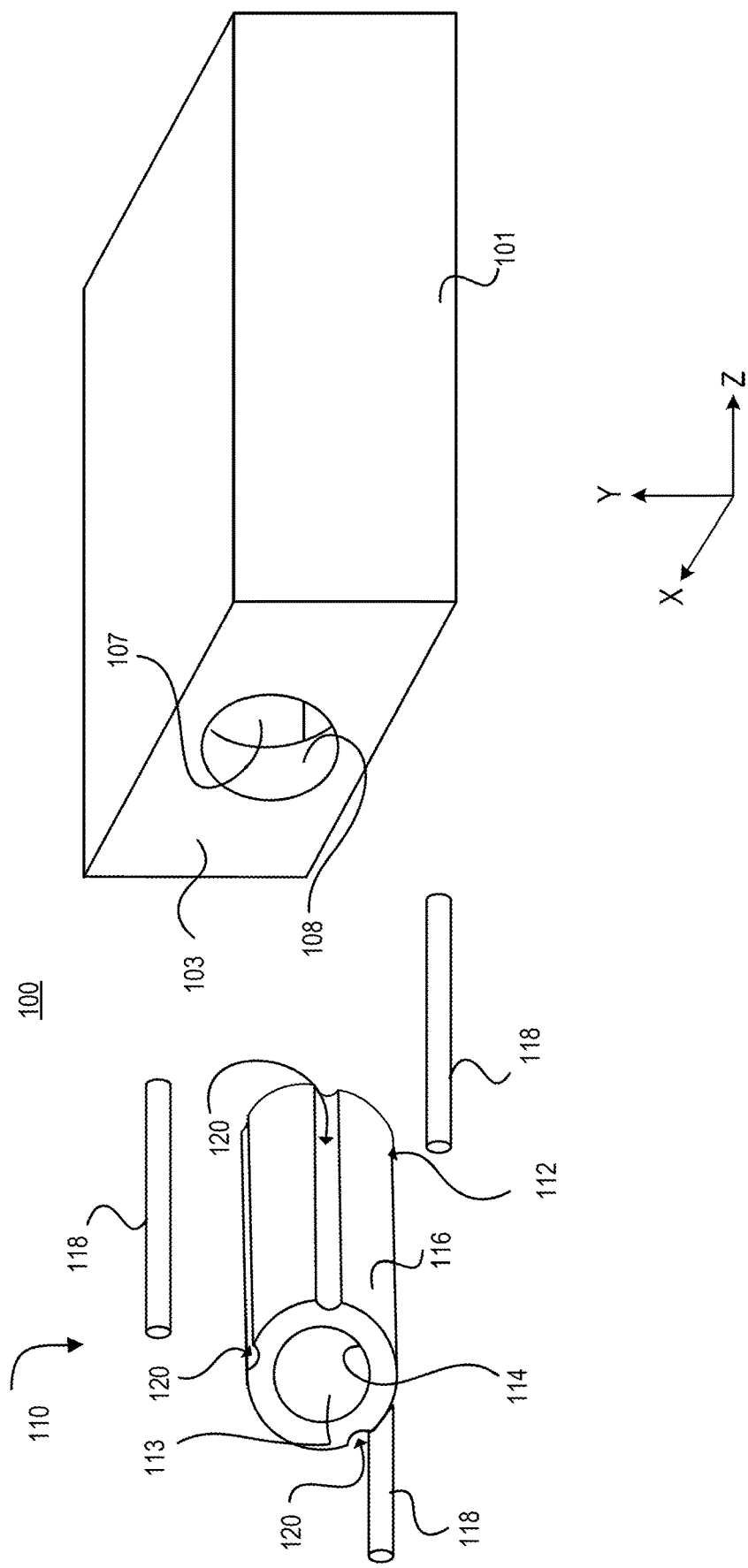
FIG. 1B is an exploded view of the light source apparatus of FIG. 1A.
Figure 1C:
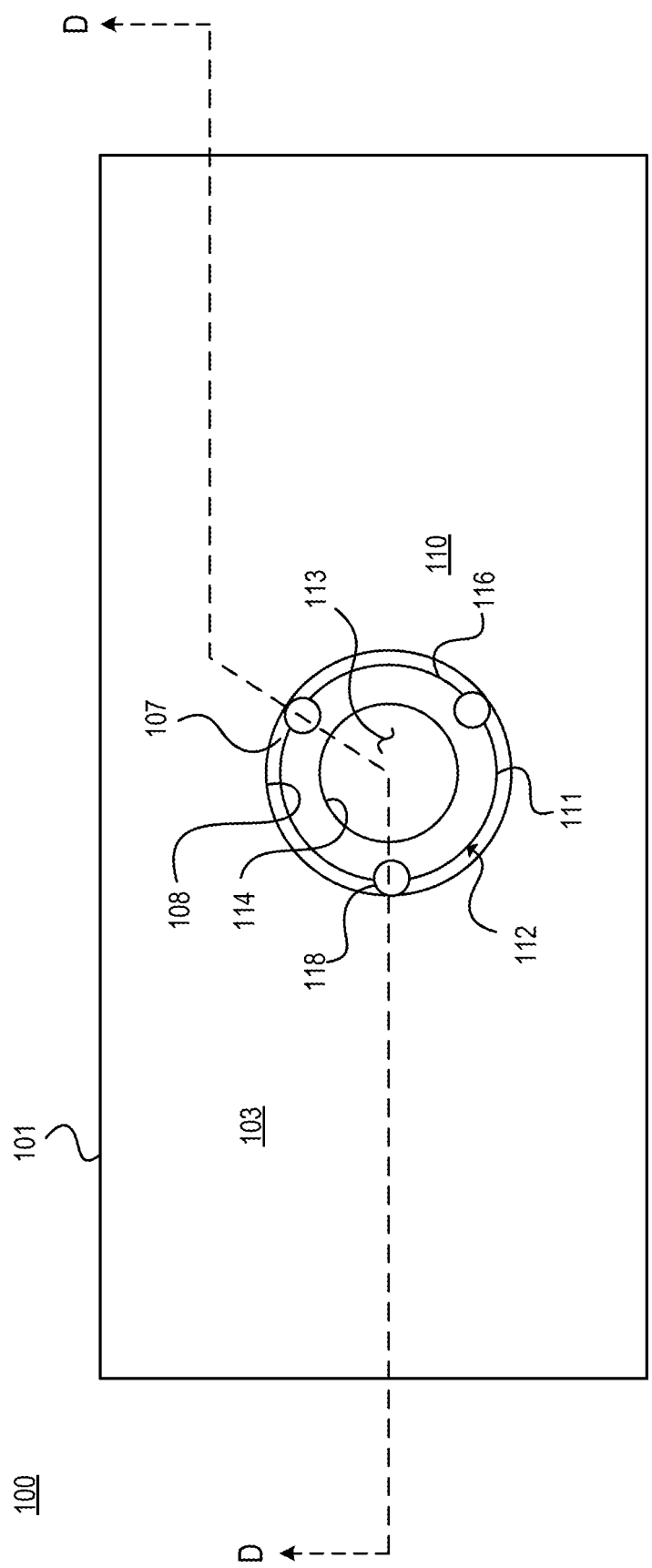
FIG. 1C is a cross-sectional view in the X-Y plane of the light source apparatus of FIG. 1B taken along a plane within the chamber wall in which the support device is arranged.
Figure 1D:
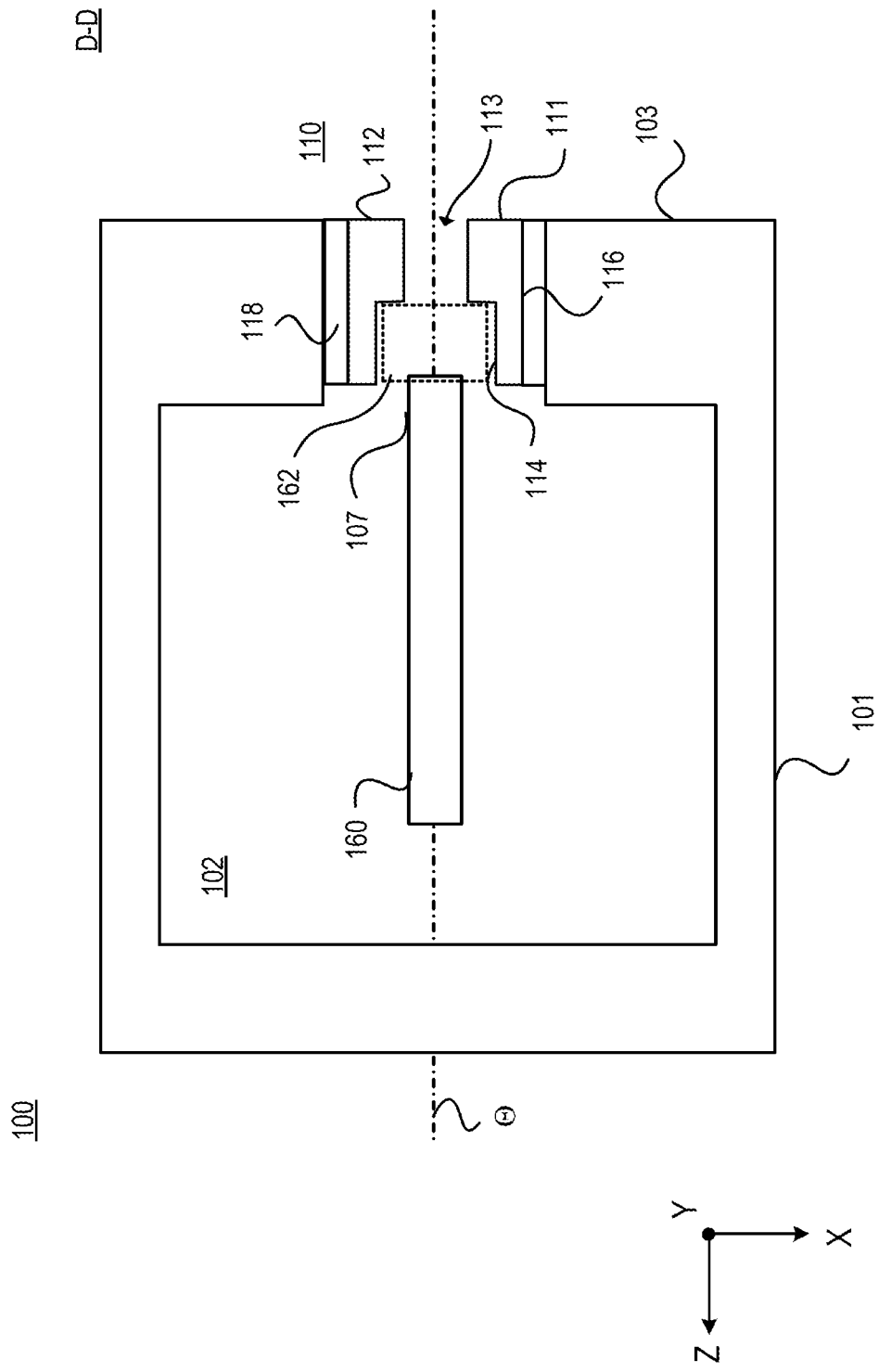
FIG. 1D is an aligned cross-sectional view along a plane D-D of FIG. 1C that includes the chamber and the support device.
Figure 2A:
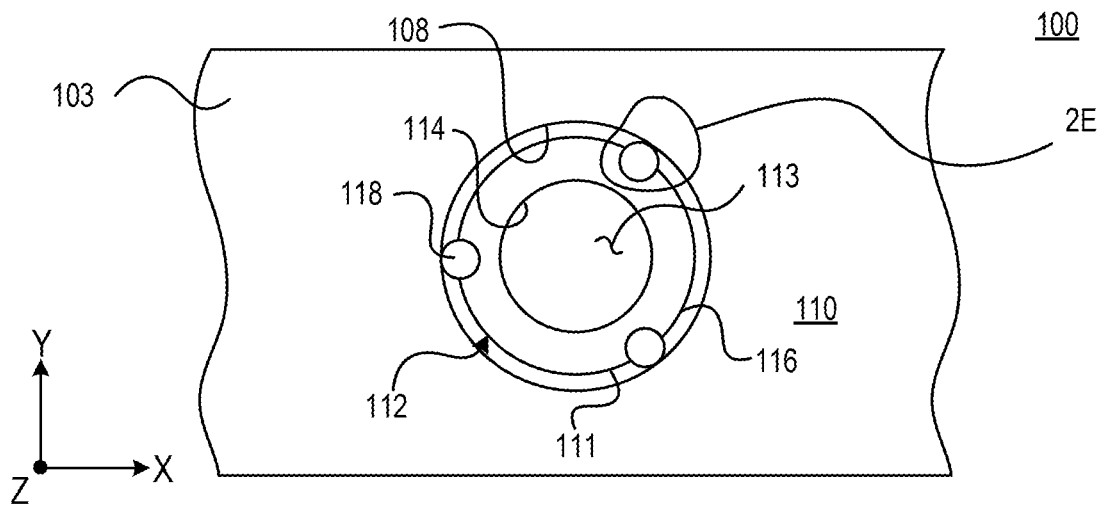
FIG. 2A is an inset of FIG. 1C that includes the chamber wall and the support device arranged within the opening of the chamber wall.
Figure 2B:
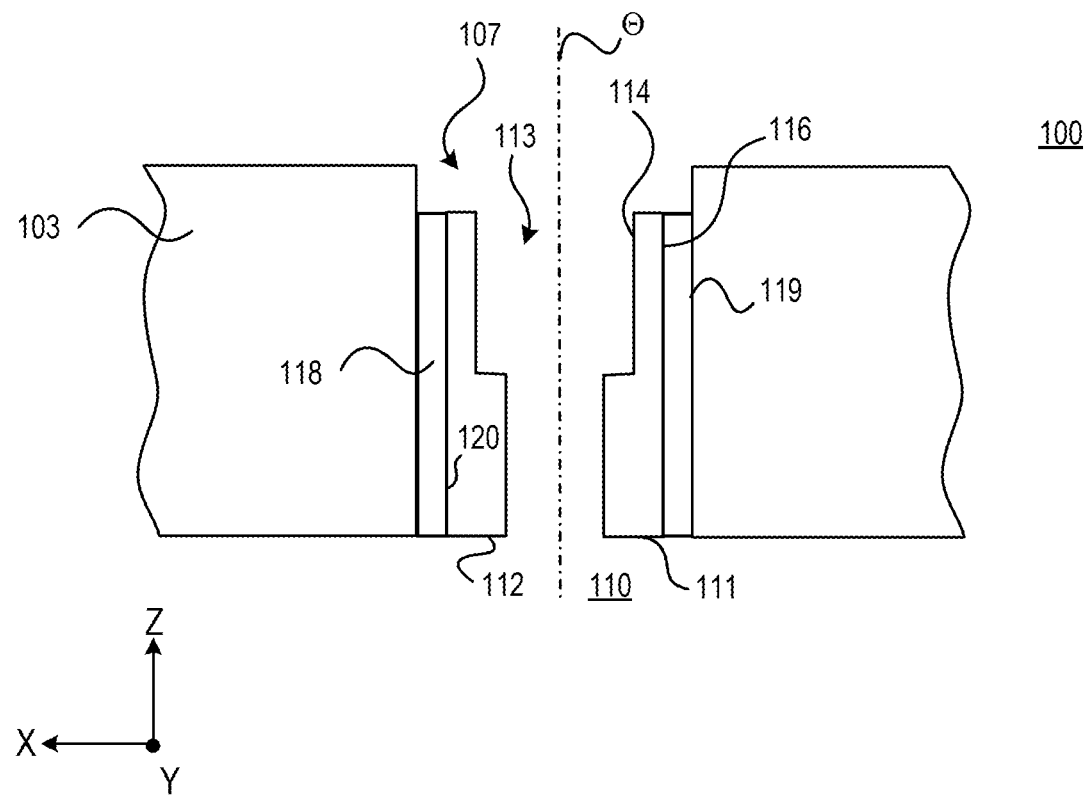
FIG. 2B is an inset of the aligned cross-sectional view of FIG. 1D that shows a portion of the chamber wall and the support device.
Figure 2E:
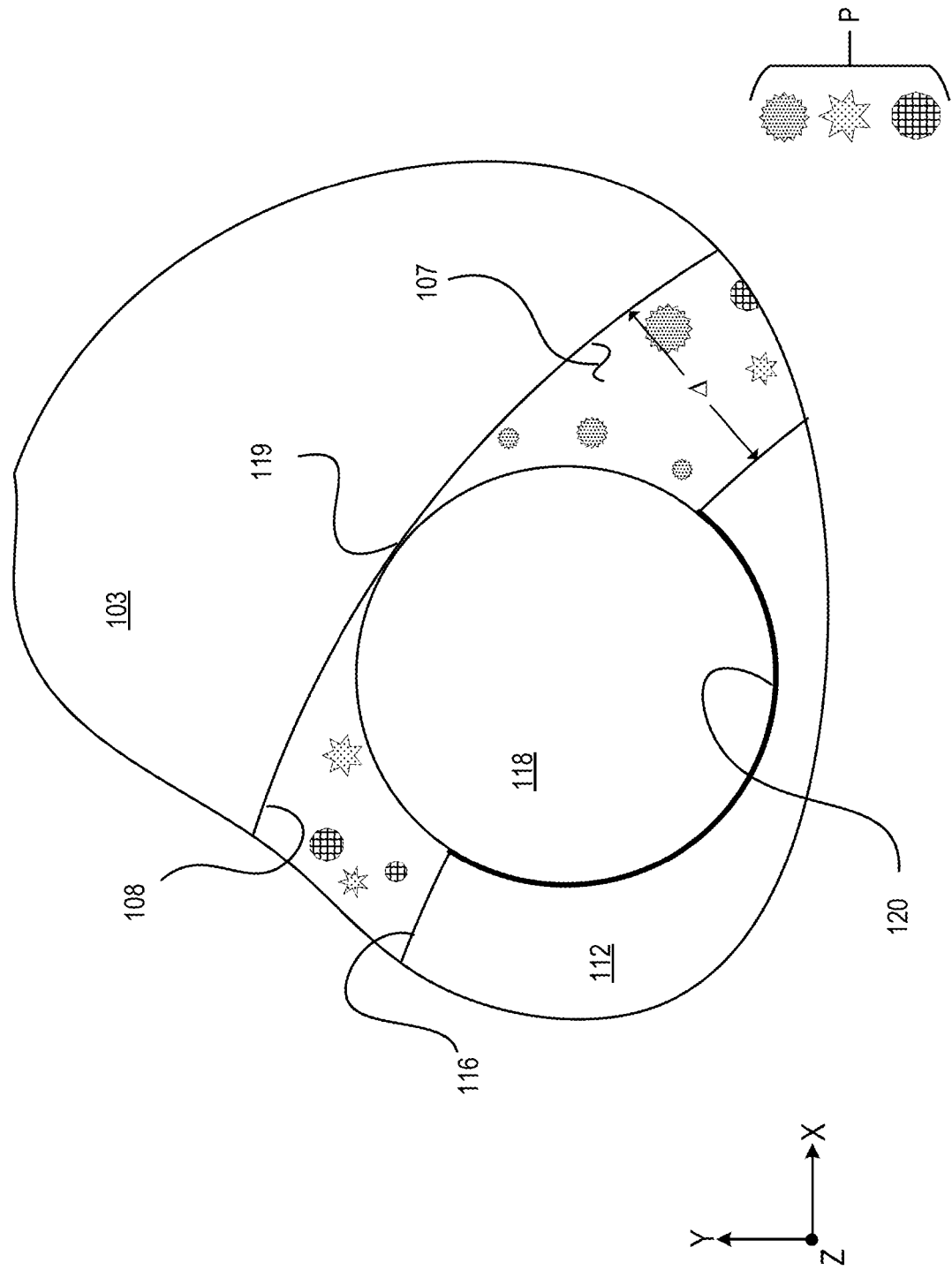
FIG. 2E is an inset view of region 2E from FIG. 2A showing details of an interface between the support device and an inner surface of the chamber wall in which the support device is arranged.

With additional reference to FIG. 2E, the outer surface 116 of the cup 112 of the support device 111 is defined by a first outer diameter 115. The plurality of rods 118 is arranged at the outer surface 116 of the cup 112 such that the plurality of rods 118 defines a second outer diameter 117. The second outer diameter 117 is greater than the first outer diameter 115 allowing the plurality of rods 118 of the support device 111 to contact the inner surface 108 of the chamber wall 103 while the outer surface 116 of the cup 112 does not contact the inner surface 108 of the chamber wall 103. Additionally, each rod 118 contacts the inner surface 108 of the chamber wall 103 at an interface 119. At the interface 119, a small or minimal portion of the outer surface of each rod 118 contacts the inner surface 108 of the chamber wall 103, and because the rod 118 extends along the Z direction, the interface 119 extends along the Z direction as well. In this way, the contact area between the support device 111 and the inner surface 108 of the chamber wall 103 is reduced to the area at the interface 119 (as opposed to the entire inner surface 108).

The distance $\Delta$ (shown in FIGS. 2D and 2E) between the first outer diameter 115 of the outer surface 116 of the cup 112 and the second outer diameter 117 defined by the plurality of rods 118 can be greater than the diameter of each of the particles P generated by abrasion of one or both of the surface materials of the support device 111 and the chamber wall 103 when the support device 111 moves along the axis of rotation ⊖ (which is parallel with the Z direction) within the chamber wall 103. For example, the distance Δ between the first outer diameter 115 and the second outer diameter 117 can be within a range of about 100 to about 4000 micrometers (μm). In this way, the region between the outer surface 116 of the cup 112 and the inner surface 108 of the chamber wall 103 is large enough such that the particles P produced due to the frictional engagement can move away from the interface 119 between the plurality of rods 118 and the chamber wall 103, and can exist within the opening 107 of the chamber wall 103 between the chamber wall 103 and the outer surface 116 of the cup 112. Thus, fretting corrosion between the plurality of rods 118 and the chamber wall 103 can be reduced.

Figure 6:
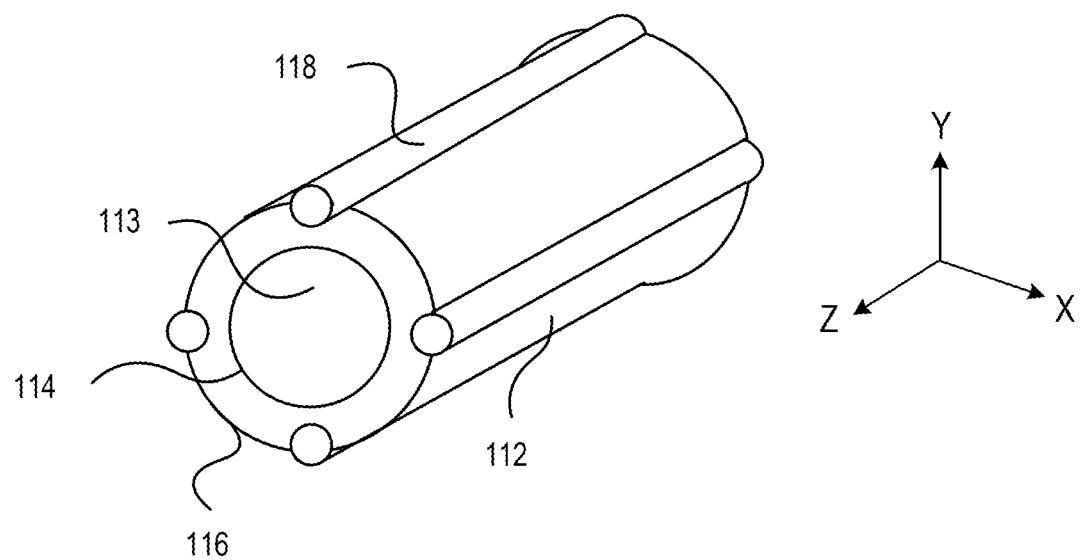
FIG. 6 is a perspective view of another implementation of the support device of FIG. 1.

The support device 111 includes three rods 118, evenly spaced around the outer surface 116 of the cup 112. For example, each of the three rods 118 can be placed 120 degrees from each of the other rods about the outer surface 116 of the cup 112. In other implementations, the support device 111 can include two or more than three rods 118. For example, the support device 111 can include four rods 118 (such as shown in FIG. 6), each of the four rods 118 placed 90 degrees from each of the other rods about the outer surface 116 of the cup 112. To reduce the contact area between the plurality of rods 118 and the inner surface 108 of the chamber wall 103, a fewer amount of rods 118 can be used. For example, the contact area between the plurality of rods 118 and the inner surface 108 of the chamber wall 103 is reduced when three rods 118 are included in the support device 111 as opposed to including more than three rods 118 in the support device 111. Reducing the contact area between the plurality of rods 118 and the inner surface 108 of the chamber wall 103 decreases the surface area in which fretting corrosion occurs when the support device 111 moves along the first direction ⊖ within the chamber wall 103. Thus, during operation of the movable apparatus 160 and the chamber 101, the amount of particles P abraded from one or both of the surface materials of the support device 111 and the chamber wall 103 is reduced when fewer rods 118 are included in the support device 111.

Each of the plurality of rods 118 is attached to the outer surface 116 of the cup 112 by an attachment mechanism or process. In one implementation, the outer surface 116 of the cup 112 can include a plurality of longitudinally-extending depressions or holes 120 (shown exposed in FIG. 1B). Each of the holes 120 is configured to receive a respective one of the plurality of rods 118. For example, the support device 111 can include three holes 120, each of the holes 120 placed 120 degrees from each of the other holes 120 about the outer surface 116 of the cup 112 such that each hole 120 receives a respective one of the plurality of rods 118. In some implementations, each of the plurality of rods 118 can be constrained to the outer surface 116 of the cup 112 by a manufacturing process. For example, each of the plurality of rods 118 can be constrained to the outer surface 116 of the cup 112 by press fitting or thermally fitting each of the rods 118 to the outer surface 116. Moreover, once the rods 118 are constrained, it may be desirable that the rods 118 are fixed and unable to move. In other implementations, each of the rods 118 that are placed in a respective one of the plurality of holes 120 can be permanently attached to the outer surface 116 of the cup 112 by, for example, an adhesive or by brazing.

As described above, the plurality of rods 118 can be made of a polished, hardened material such as, for example, polished, hardened steel. The use of a polished material reduces the number of particles P that can be generated from frictional engagement between the plurality of rods 118 and the chamber wall 103 by reducing microscale inconsistencies on the surface of the material of the plurality of rods 118. The use of a hardened material further reduces the number of particles P that can be generated by increasing the resistance to corrosion of the surface material of the plurality of rods 118. As such, the corrosion of the surface material of the plurality of rods 118 contacting the chamber wall 103 is reduced by using a material that is both polished and hardened.

With reference to FIG. 3, the light source apparatus 100 can be a part of a light source 380. The light source 380 includes a light generation apparatus configured to produce a light beam 376 and a support apparatus 310 associated with the light generation apparatus. The light generation apparatus is defined by a discharge chamber 301 defining a hermetically-sealed interior cavity 102 that is configured to hold a gas mixture including a gaseous gain medium 389 for producing the light beam 376. The light generation apparatus also includes a rotatable fan 360 that extends through the interior cavity 302 of the discharge chamber 301, the rotatable fan 360 configured to circulate the gas mixture within the cavity 302.

The support apparatus 310 includes a partially-constrained support device 311 and a fully-constrained support device 341 each configured to hold a respective end (or post) of the rotatable fan 360. The discharge chamber 301 includes a first chamber wall 303 and a second chamber wall 304. The first chamber wall 303 includes an opening 307, and the second chamber wall 304 includes an opening 347. The central axes of the opening 307 and the opening 347 are positioned along an axis of rotation ⊖ of the rotatable fan 360.

The rotatable fan 360 includes a central portion 366, a first end 363, and a second end 364. The central portion 366 can include a cylindrical shape that extends along the rotation axis ⊖. The central portion 366 can include a plurality of blades that extend along the rotatable fan 360 in the Z direction. The first end 363 extends from the central portion 366 in the negative Z direction and is configured to be retained within the bearing 362 that is held within the partially-constrained support device 311. The second end 364 extends from the central portion 366 in the positive Z direction and is configured to be retained within the fully-constrained support device 341. Each of the first end 363 and the second end 364 can have a cylindrical shape such as a post. The first end 363 and the second end 363 are attached or fixed or integral to the central portion 366 such that the first end 363 and the second end 364 do not rotate relative to the central portion 366 when the central portion 366 is rotated about the rotation axis ⊖. In other words, the rotatable fan 360 is a unitary structure, the central portion 366, the first end 363, and the second end 364 rotating together during operation of the rotatable fan 360. During operational use, the rotatable fan 360 is configured to circulate the gaseous gain medium of the gas mixture within the interior cavity 302 by rotating about the rotation axis ⊖.

The partially-constrained support device 311 is an implementation of the support device 111, as shown in FIGS. 2A-2D. The partially-constrained support device 311 is positioned within the opening 307 of the first chamber wall 303 and is configured to receive the first end 363 of the rotatable fan 360. The partially-constrained support device 311 is configured to move along the rotation axis ⊖ within and relative to the chamber wall 303. For example, during operation of the rotatable fan 360 and the discharge chamber 301 to produce the light beam 376, vibrations can cause the partially-constrained support device 311 to move along the rotation axis ⊖ (this motion being shown by the double-sided arrow 365).

The partially-constrained support device 311 can be designed like the support device 111 to include a cup having an inner surface and an outer surface, and a plurality of rods arranged at the outer surface of the cup. The inner surface of the cup is configured to retain the bearing 362, and the bearing 362 is configured to retain the first end 363 of the rotatable fan 360. The plurality of rods of the support device 111 contact the inner surface of the first chamber wall 303 and the outer surface of the cup does not contact the inner surface of the first chamber wall 303 when the partially-constrained support device 311 is positioned within the opening 307 of the first chamber wall 303.

The fully-constrained support device 341 can include a second cup having an inner surface and an outer surface. The inner surface is configured to retain a second bearing, the bearing configured to retain the second end 364 of the rotatable fan 360. The second cup is configured to be positioned within the opening 347 of the second chamber wall 304 such that the fully-constrained support device 341 is fixed within the second chamber wall 304; that is, the support device 341 does not move or translate along the rotation axis ⊖. The outer surface of the second cup can be permanently attached to the inner surface of the second chamber wall 304 within the opening 347. As such, the outer surface of the second cup can be defined by a diameter that is approximately equal to a diameter of the opening 347 of the second chamber wall 304. Thus, the fully-constrained support device 341 does not move within or relative to the second chamber wall 304. During operation of the rotatable fan 360 and the discharge chamber 301, vibrations that may be generated on the fully-constrained support device 341 do not cause the fully-constrained support device 341 to move along the rotation axis ⊖, since the fully-constrained support device 341 remaining fixed within the second chamber wall 304.

Thus, the partially-constrained support device 311 receives the first end 363 of the rotatable fan 360 and the fully-constrained support apparatus 341 receives the second end 364 of the rotatable fan 360. In this way, the support apparatus 311 holds the rotatable fan 360 within the interior cavity 302 of the discharge chamber 301.

The cup of the partially-constrained support device 311 and the second cup of the fully-constrained support device 341 can be made of a rigid material such as, for example, a nickel alloy, including Monel. Each of the plurality of rods 118 of the partially-constrained support device 311 can be made of a hardened material such as, for example, a hardened, polished steel. The discharge chamber 301 can also be made of a rigid material such as, for example, nickel-plated aluminum. The rotatable fan 360 can be made of the same material as the walls of the discharge chamber 301 such as, for example, nickel-plated aluminum.

As discussed above, the discharge chamber 301 is configured to hold the gas mixture for producing the light beam 376. To this end, the first chamber wall 303 also retains or holds a first optical element 350 and the second chamber wall 304 also retains or holds a second optical element 352. The first optical element 350 and the second optical element 352 can form an optical pathway for the light beam 376. For example, each of the optical elements 350, 352 can include a window that allows the light beam 376 to travel in to and out of the interior cavity 302 of the discharge chamber 301. In some implementations, the discharge chamber 301 can include an energy source 384 configured to supply energy to the gaseous gain medium 389 in the interior cavity 302. In these implementations, and when the discharge chamber 301 contains the gaseous gain medium 389, one or more of the optical elements 350, 352 can form at least part of an optical resonator or can be positioned within an optical resonator. For example, the optical element 350 can be an input/output window that is partially reflective, thus enabling a portion of the light that is formed within the cavity 302 to be directed as the light beam 376.

During operational use of the light source 380, the interior cavity 302 of the discharge chamber 301 can encounter fluctuating temperatures, in which increasing temperatures can cause thermal expansion of the rotatable fan 360, as well as thermal expansion of the discharge chamber 301. Thermal expansion of the discharge chamber 301 can cause movement of the first and second chamber walls 303 and 304. Thermal expansion of the rotatable fan 360 can include the rotatable fan 360 expanding at least along the axis of rotation ⊖. As such, the first end 363 can move in the negative Z direction as the rotatable fan 360 thermally expands along the axis of rotation ⊖, the second end 364 remaining fixed in position within the second chamber wall 304. In this way, the first end 363 moving along the axis of rotation ⊖ causes the partially-constrained support device 311 to also move in the negative Z direction along the axis of rotation ⊖.

The thermal expansion of the rotatable fan 360 tends to be more rapid than the thermal expansion of the first and second chamber walls 303, 304. First, the rotatable fan 360 generates heat by imparting energy to the gaseous gain medium 389. Second, the rotatable fan 360 is an open (high surface area) structure (compared to the chamber walls 303 and 304). Third, the rotatable fan 360 is much lighter than the chamber walls 303, 304. Because of these factors, the rotatable fan 360 can increase in temperature at a faster rate than each of the first and second chamber walls 303 and 304. As such, the temperature of the rotatable fan 360 rises faster than the temperature of the first and second chamber walls 303 and 304, causing the rotatable fan 360 to thermally expand in the negative Z direction more than the first and second chamber walls 303 and 304. Because of the difference in temperatures of the rotatable fan 360 and the discharge chamber 301, the partially-constrained support device 311 is moved relative to and within the first chamber wall 303. Additionally, the movement between the support device 311 and the first chamber wall 303 can translate back and forth along the axis of rotation ⊖ as the temperature of the environment fluctuates. For example, the support device 311 can oscillate back and forth along the axis of rotation ⊖.

This movement between the partially-constrained support device 311 and the first chamber wall 303 causes frictional engagement between the plurality of rods of the partially-constrained support device 311 and the inner surface of the first chamber wall 303, of which can result in fretting corrosion, as discussed above. The interface between the partially-constrained support device 311 and the first chamber wall 303 is limited to the region at which the plurality of rods, instead of the entire outer surface of the cup, contact the inner surface of the first chamber wall 303, and this reduces fretting corrosion of the contact interface. Additionally, the plurality of rods of the partially-constrained support device 311 can be made of a hardened, polished material, further reducing the abrasion of the surface material of the plurality of rods. Further, the particles (such as particles P shown in FIG. 2E) that are generated from corrosion of the surface material between the plurality of rods and the inner surface of the first chamber wall 303 are free to fall away from or to be directed away from the contact interface between the plurality of rods of the support device 311 and the first chamber wall 303 rather than being trapped between the contacting surfaces, as shown in FIG. 2E. In this way, fretting corrosion is reduced between the plurality of rods and the inner surface of the first chamber wall 303 by including the partially-constrained support device 311 to hold the first end 363 of the rotatable fan 360 within the discharge chamber 382.

With reference to FIG. 4, in other implementations, the light source 380 can be a dual-chamber ultraviolet light source 480 that includes two discharge chambers 401A, 401B, and a support apparatus 410A, 410B associated with a respective discharge chamber 401A, 401B. Each discharge chamber 401A, 401B is an implementation of the discharge chamber 301 (FIG. 3). Each discharge chamber 401A, 401B is configured to hold a gaseous gain medium 489A, 489B in the respective interior cavity 402A, 402B, each interior cavity 402A, 402B defined by a set of respective chamber walls. Each discharge chamber 401A, 401B includes a respective first chamber wall 403A, 403B and a respective second chamber wall 404A, 404B. Each support apparatus 410A, 410B includes a partially-constrained support device 411A, 411B configured to be positioned within an opening of one of the chamber walls of each discharge chamber 401A, 401B. Each partially-constrained support device 411A, 411B is an implementation of the support device 111, as shown in FIGS. 2A-2E. Each partially-constrained support device 411A, 411B can be designed like the support device 111 to include the cup 112 having an inner surface and an outer surface and the plurality of rods 118 arranged at the outer surface of the cup 112. Each partially-constrained support device 411A, 411B is positioned within a respective opening 407A, 407B of the first chamber wall 403A, 403B of each discharge chamber 401A, 401B such that the plurality of rods 118 of the support device 411A, 411B contacts the inner surface of the respective opening 407A, 407B of the first chamber wall 403A, 403B and the outer surface of the cup 112 does not contact the inner surface of the opening 407A, 407B.

The ultraviolet light source 480 is configured to produce a light beam 476 in the ultraviolet range for use by, for example, a lithography exposure apparatus 485 for patterning a semiconductor substrate or wafer 486. For example, in implementations that include a deep ultraviolet (DUV) light source as the light source 480, the discharge chamber 401A can be a part of a master oscillator that produces a seed light beam 475 that is fed to the discharge chamber 401B, which is a part of a power amplifier. Other implementations of the light source 480 are possible. The gaseous gain medium 489A, 489B used in the respective discharge chamber 401A, 401B can be a combination of suitable gases for producing the respective light beam 475, 476 around the required wavelengths, bandwidth, and energy. For example, the gas mixture 489A, 489B can include argon fluoride (ArF), which emits light at a wavelength of about 193 nm, or krypton fluoride (KrF), which emits light at a wavelength of about 248 nm.

As described above, each discharge chamber 401A, 401B is defined by chamber walls. In operation, the chamber walls of each discharge chamber 401A, 401B can be sealable such that each interior cavity 402A, 402B is hermetically sealed. Each discharge chamber 401A, 401B can include an energy source 484A, 484B, respectively configured to supply energy to the gaseous gain medium 489A, 489B in each interior cavity 402A, 402B. For example, each energy source 484A, 484B can include a pair of electrodes that form a potential difference and, in operation, excite the gaseous gain medium 489A, 489B. Each discharge chamber 401A, 401B can also include a rotatable fan 460A, 460B within the respective interior cavity 402A, 402B. Each rotatable fan 460A, 460B is an implementation of the rotatable fan 360 (FIG. 3). Each rotatable fan 460A, 460B can be designed like the rotatable fan 360 to include a central portion 466A, 466B, a first end 463A, 463B, and a second end 464A, 464B, respectively. Each central portion 466A, 466B, first end 463A, 463B, and second end 464A, 464B can include a cylindrical shape. The first end 463A, 463B of each rotatable fan 460A, 460B is configured to be retained within the partially-constrained support device 411A, 411B. During operational use, each rotatable fan 460A, 460B is configured to circulate the gaseous gain medium 489A, 489B within each interior cavity 402A, 402B by rotating about a respective rotation axis OA, OB.

In some implementations, each support apparatus 410A, 410B also includes a respective fully-constrained support device, such as the fully-constrained support device 341 (of FIG. 3). The fully-constrained support device can be positioned within a second opening of the second chamber wall 404A, 404B of each discharge chamber 401A, 401B such that the outer surface of the second cup contacts an inner surface of the second opening of each second chamber wall 404A, 404B. The partially-constrained support device 411A, 411B positioned within each first chamber wall 403A, 403B can be positioned opposite to the second chamber wall 404A, 404B such that the partially-constrained support device 411A, 411B is symmetrically placed from the second opening of the second chamber wall 404A, 404B. For example, the fully-constrained support device can be positioned such that the central axis of the second cup is aligned with the respective rotation axis OA, OB. Additionally, the second end 464A, 464B of each rotatable fan 460A, 460B can be configured to be positioned within the fully-constrained support device. In this way, in these implementations, the partially-constrained support device 411A, 411B and the fully-constrained support device can support the rotatable fan 460A, 460B within the interior cavity 402A, 402B of each discharge chamber 401A, 401B.

Each discharge chamber 401A, 401B can include one or more optical components. For example, the discharge chamber 401A includes optical elements 450A and 452A. The optical elements 450A, 452A can include windows that allow a light beam to travel in to and out of the interior cavity 402A of the discharge chamber 401A. The optical element 450A can be a partially reflecting/partially transmitting optical coupler to enable the seed light beam 475 to exit the discharge chamber 401A. Moreover, the ultraviolet light source 480 can further include other optical elements external to the discharge chamber 401A such as an optical element 455A corresponding to a spectral feature module that selects a wavelength and/or a bandwidth of the seed light beam 475 output from the discharge chamber 401A. In this example, the optical element 450A is held within the chamber wall 403A and the optical element 452A is held within the chamber wall 404A.

The discharge chamber 401B includes optical elements 450B and 452B. The optical elements 450B, 452B can include windows that allow a light beam (such as seed light beam 475 and light beam 476) to travel in to and out of the interior cavity 402B of the discharge chamber 401B. Moreover, the ultraviolet light source 480 can further include other optical elements external to the discharge chamber 401B such as an optical element 455B corresponding to a beam reverser or turner configured to direct the light beam 476 back through the discharge chamber 401B. In the example of FIG. 4, the optical element 450B is held within the chamber wall 403B and the optical element 452B is held within the chamber wall 404B.

During operational use of the light source 480, the interior cavity 402A, 402B of each discharge chamber 401A, 401B can encounter fluctuating temperatures, in which increasing temperatures can cause thermal expansion of the rotatable fan 460A, 460B, as well as thermal expansion of each discharge chamber 401A, 401B. Thermal expansion of the discharge chamber 401A, 401B can cause movement of the first and second chamber walls 403A, 403B and 404A, 404B. Thermal expansion of the rotatable fan 460A, 460B can include the rotatable fan 460A, 460B expanding at least along the respective axis of rotation ⊖A, ⊖B. As such, each first end 463A, 463B can move in the negative Z direction (associated with the coordinate system of the chamber 401A, 401B) as each rotatable fan 460A, 460B thermally expands along the axis of rotation ⊖A, ⊖B, while each second end 464A, 464B remaining fixed in position within the second chamber wall 404A, 404B. In addition, operation of each rotatable fan 460A, 460B and each discharge chamber 401A, 401B can cause unwanted vibrations in the ultraviolet light source 480. By including the partially-constrained support device 411A, 411B to support each rotatable fan 460A, 460B, the contact interface between each partially-constrained support device 411A, 411B and each inner surface of each opening 407, 407B is reduced such that only the plurality of rods contacts the inner surface of the opening 407A, 407B, reducing the contact area in which fretting corrosion may occur. In addition, the partially-constrained support device 411A, 411B can be made of a hardened, polished material, further reducing the abrasion of the surface material of the plurality of rods. Further, the particles (such as particles P shown in FIG. 2E) that are generated from corrosion of the surface material between the plurality of rods and the inner surface of the opening 407A, 407B are free to fall away from or to be directed away from the contact interface between the plurality of rods and the inner surface of the opening 407A, 407B rather than being trapped between the contacting surfaces. In this way, during operation of the ultraviolet light source 480, fretting corrosion is reduced in each of the chambers 401A, 401B, specifically between each partially-constrained support device 411A, 411B and the inner surface of the opening 407A, 407B of each first chamber wall 403A, 403B by including the partially-constrained support device 411A, 411B to hold each rotatable fan 460A, 460B within each discharge chamber 401A, 401B of the light source 480.

Figure 5:
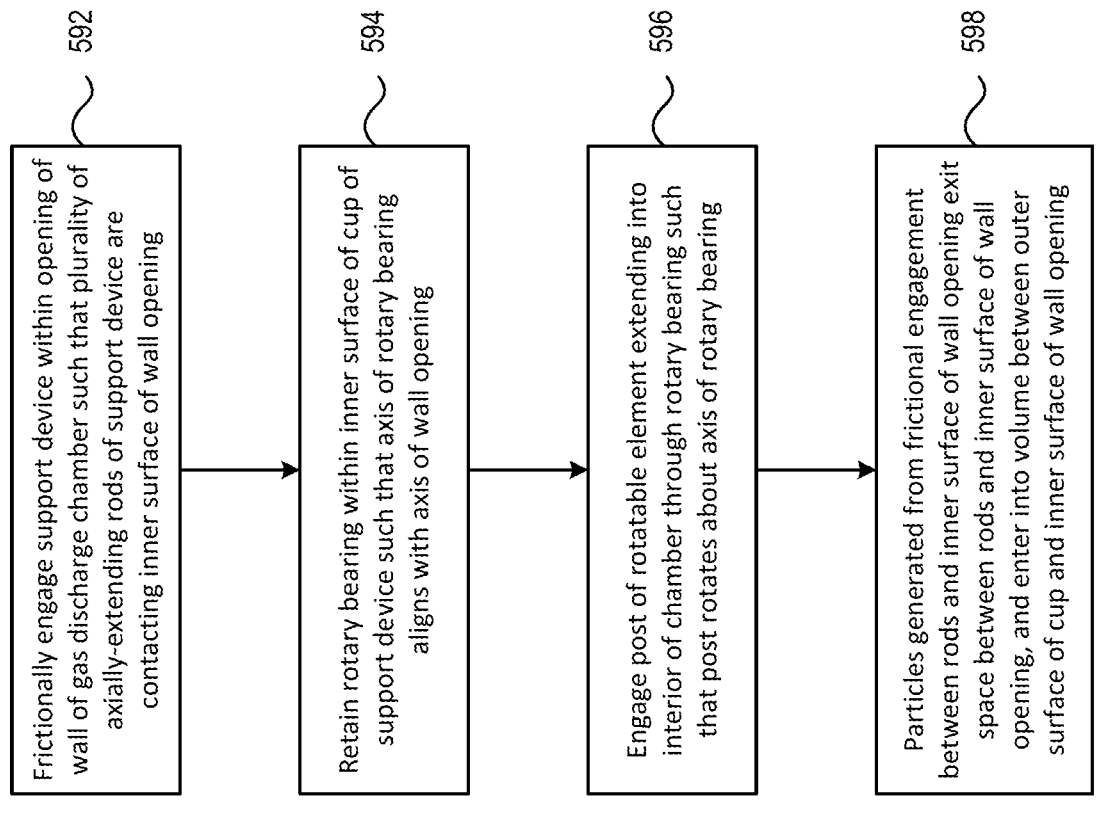
FIG. 5 is a flow chart showing a procedure for reducing fretting corrosion between a support device and a chamber wall of a chamber in a light source apparatus.

With reference to FIG. 5, a procedure 590 for reducing fretting corrosion between a support device 111 and a chamber wall 103 of a light source is performed. The procedure 590 can be performed with respect to the support device 111 and the chamber wall 103 (FIGS. 1A-1D and FIGS. 2A-2E), the partially-constrained support device 311 and the chamber wall 303 (FIG. 3), or each of the partially-constrained support devices 411A, 411B and each respective chamber wall 403A, 403B (FIG. 4). The procedure 590 is discussed with respect to the support device 111 and the chamber wall 103 of the light source apparatus 100 (with reference to FIGS. 1A-1D and FIGS. 2A-2E).

The support device 111 is frictionally engaged within the opening 107 of the chamber wall 103 such that the plurality of rods 118 of the support device 111 are contacting the inner surface 108 of the opening 107 of the chamber wall 103 (592). The plurality of rods 118 extend beyond the outer surface 116 of the cup 112 such that the cup 112 does not contact the chamber wall 103 when the support device 111 is positioned within the opening 107 of the chamber wall 103. For example, if the support device 111 does not include the plurality of rods 118, the contact area between the cup 112 and the chamber wall 103 includes at least a portion of the area of the outer surface 116 of the cup 112. Instead, each rod 118 contacts the inner surface 108 of the chamber wall 103 at the interface 119 of each rod 118 (as shown in FIG. 2E). As such, a small or minimal portion of the outer surface of each rod 118 contacts the inner surface 108 of the chamber wall 103. In this way, the contact area between the support device 111 and the inner surface 108 of the chamber wall 103 is reduced to the area at the interface 119 of each rod 118.

The bearing 162 is retained within the inner surface 114 of the cup 112 of the support device 111 such that the axis of the bearing 162 aligns with the axis of the opening 107 of the chamber wall 103 (594). For example, the axis of the bearing 162 and the axis of the opening 107 can align with the axis of rotation ⊖. As described above, the inner surface 114 of the cup 112 can have a diameter that is slightly smaller than the diameter of the outer surface of the bearing 162. The cup 112 can be heated such that the cup 112 expands by thermal expansion, increasing the diameter of the inner surface 114 of the cup 112 to a diameter that is slightly greater than the diameter of the outer surface of the bearing 162. Accordingly, the bearing 162 can be placed within the inner surface 114 of the cup 112 while the inner surface 114 of the cup 112 is thermally expanded. When the cup 112 is cooled, the diameter of the inner surface 114 of the cup 112 decreases and the cup 112 tightly clamps the bearing 162 in place within the inner surface 114 of the cup 112. The bearing 162 can be a rotatory bearing configured to retain an apparatus that rotates about the axis of rotation ⊖.

An end of the movable apparatus 160 extending into the interior 102 of the chamber 101 is engaged within the bearing 162 such that the movable apparatus 160 can rotate about the axis of the bearing 162 (596). For example, when the axis of the bearing 162 aligns with the rotation axis ⊖, the movable apparatus 160 is engaged within the bearing 162 such that the axis of rotation of the movable apparatus 160 also aligns with the rotation axis Θ. The movable apparatus 160 can be the rotatable fan 360 (FIG. 3) or either of the rotatable fans 460A and 460B (FIG. 4). Each of the rotatable fans 360, 460A, 460B can be engaged within the bearing 162 by engaging the first end 363, 463A, 463B of each rotatable fan 360, 460A, 460B within the bearing 162. Each of the rotatable fans 360, 460A, 460B extend into the interior 307, 407A, 407B of each respective chamber 301, 401A, 401B such that each rotatable fan 360, 460A, 460B can circulate the gaseous gain medium 389, 489A, 489B within each interior cavity 302, 402A, 402B by rotating about the respective rotation axis ⊖A, ⊖B. In addition, the bearing 162 can be configured to constrain relative motion of the movable apparatus 160 to only a desired motion. Moreover, the bearing 162 can be configured to reduce friction between the movable apparatus 160 and the chamber wall 103.

In some implementations, the bearing 162 is not included and the end of the movable apparatus 160 is engaged directly within the inner surface 114 of the cup 112. In these implementations, the movable apparatus 160 can be any apparatus that engages longitudinally with the cup 112, moving back and forth within the chamber wall 103.

During operational use of the light source apparatus 100, the interior cavity 102 can encounter fluctuating temperature, in which increasing temperature cause thermal expansion of the movable apparatus 160, as well as thermal expansion of the discharge chamber 101. In addition, operation of the movable apparatus 160 and the discharge chamber 401 can cause unwanted vibrations in the light source apparatus 100. The thermal expansion of the movable apparatus 160 and the chamber 101, and operational vibrations can cause the support device 111 to move in the Z-direction along the rotation axis ⊖. Such motion can cause frictional engagement between the support device 111 and the chamber wall 103. The frictional engagement between the support device 111 and the chamber wall 103 can cause particles (such as particles P shown in FIG. 2E) to be generated by abrasion of the surface material in the contact area between the support device 111 and the chamber wall 103.

Particles generated from frictional engagement between the plurality of rods 118 and the inner surface 108 of the opening 107 of the chamber wall 103 exit the space or interface 119 between the plurality of rods 118 and the inner surface 108 of the opening 107 of the chamber wall 103, and enter into the volume between the outer surface 116 of the cup 112 and the inner surface 108 of the opening 107 of the chamber wall 103 (598). Specifically, the inclusion of the plurality of rods 118 that extend beyond the outer surface 116 of the cup 112 in the support device 111 allows a volume between the outer surface 116 of the cup 112 and the inner surface 108 of the opening 107 to be defined. In this way, the support device 111 allows for the particles to exit the space between the plurality of rods 118 and the inner surface 108 of the opening 107, and enter into the volume between the outer surface 116 of the cup 112 and the inner surface 108 of the opening 107. In this way, during operation of the light generation apparatus 100, fretting corrosion is reduced between support device 111 and the inner surface 108 of the opening 107 of the chamber wall 103 by including the support device 111 to hold the movable apparatus 160 within the chamber 101.

Figure 7:
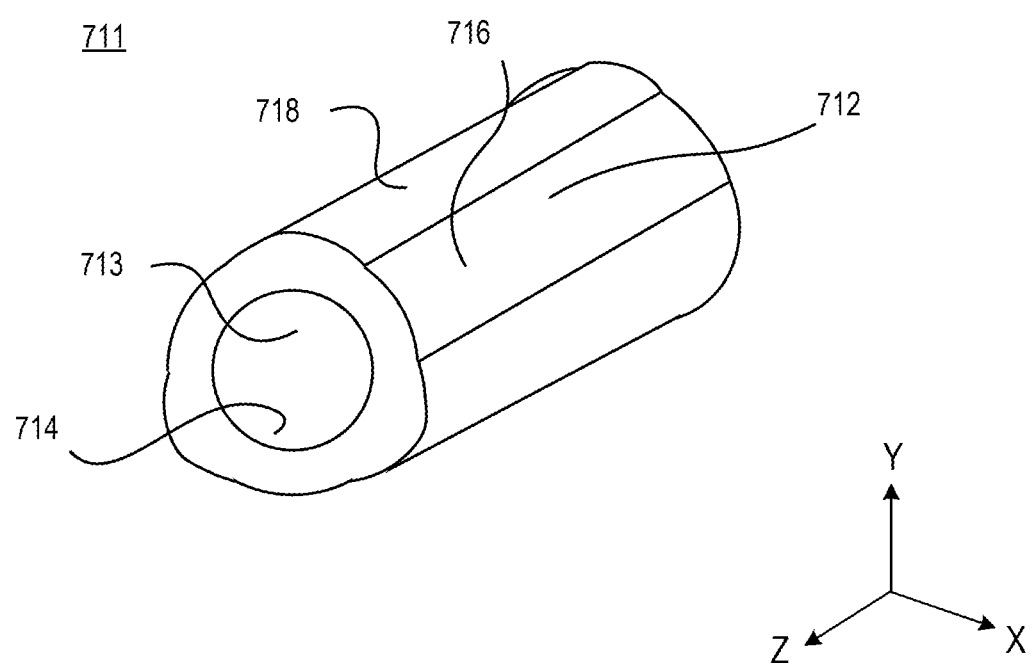
FIG. 7 is a perspective view of another implementation of the support device of FIG. 1.

For example, another implementation of a support device 711 is shown in FIG. 7. In this implementation, a cylindrical hollow region 713 is defined by an inner surface 714 of the support device 711, where the region 713 and the inner surface 714 is configured to retain the bearing 162. The support device 711 has an outer surface 716 having a first smaller outer diameter and a plurality of raised ridges 718 arranged at the outer surface 716. The arrangement of the raised edges 718 defines a second larger outer diameter. The surface area of the raised edges 718 is smaller than the surface area of the outer surface 716 and moreover the interface between the support device 711 and the inner surface of the chamber wall 103 is limited to the longitudinally-extending (along the Z direction) ridges of the raised edges 718. In this implementation, it is possible for the entire support device 711, including the raised edges 718, to be made of a hardened material.

Other aspects of the invention are set out in the following numbered clauses.

1. A light source apparatus comprising:
   a chamber comprising a chamber wall defining an opening; and
   a support apparatus comprising a support device positioned within the opening of the chamber wall, the support device comprising:
   a cup having an inner surface configured to retain a movable apparatus and an outer surface having a first outer diameter; and
   a plurality of rods arranged at the outer surface of the cup such that the arrangement of the plurality of rods defines a second outer diameter, the second outer diameter greater than the first outer diameter; and
   wherein the chamber wall is configured to hold the support device such that the chamber wall contacts the plurality of rods when the support device is positioned within the opening of the chamber wall, and the outer surface of the cup does not contact the chamber wall.
2. The light source apparatus of clause 1, wherein the movable apparatus comprises a bearing configured to be retained within the inner surface of the cup.
3. The light source apparatus of clause 2, wherein the bearing is a ball bearing.
4. The light source apparatus of clause 2, wherein the bearing is configured to receive a post of a rotatable fan, the opening is cylindrical, and the axis of rotation of the fan is parallel with the axis of the opening.
5. The light source apparatus of clause 1, wherein the movable apparatus comprises a rotatable fan.
6. The light source apparatus of clause 5, wherein the opening extends through the chamber wall and the rotatable fan is disposed inside the chamber.
7. The light source apparatus of clause 1, wherein the outer surface of the cup further comprises a plurality of holes, each of the holes configured to receive a respective one of the plurality of rods.
8. The light source apparatus of clause 1, wherein the plurality of rods includes three rods, each rod placed 120 degrees from each of the other rods about the outer surface of the cup.
9. The light source apparatus of clause 1, wherein each of the plurality of rods comprises hardened, polished steel.
10. The light source apparatus of clause 1, wherein the support device is configured to freely move in a first direction within the opening of the chamber wall, the first direction parallel to an axis of the opening.
11. The light source apparatus of clause 1, wherein a distance between the first outer diameter of the outer surface of the cup and the second outer diameter defined by the plurality of rods is greater than a diameter of each of the particles.
12. The light source apparatus of clause 11, wherein the distance between the first outer diameter and the second outer diameter is within a range of about 100 to about 4000 micrometers.
13. The light source apparatus of clause 1, wherein the opening is cylindrically shaped, the cup is cylindrically shaped, and the rods are disposed parallel to a cylindrical axis of the cup such that the support device is configured to freely move in a direction within the opening that is parallel to an axis of the opening.
14. The light source apparatus of clause 1, wherein the support apparatus further comprises a constrained support device fixed within an opening of another chamber wall of the chamber.
15. The light source apparatus of clause 14, wherein the constrained support device comprises a second cup comprising an inner surface configured to retain the movable apparatus and an outer surface, and wherein the opening of the other chamber wall is configured to hold the second cup such that the other chamber wall contacts the outer surface of the second cup when the second cup is positioned within the second opening of the second chamber wall.
16. The light source apparatus of clause 1, wherein each of the plurality of rods is constrained to the outer surface of the cup.
17. An ultraviolet light source comprising:
a light generation apparatus comprising at least one discharge chamber configured to hold a gaseous gain medium and to produce a light beam, each of the at least one discharge chambers comprising chamber walls that define an interior cavity; and a support apparatus comprising a partially-constrained support device associated with a discharge chamber and positioned within an opening of one of the chamber walls of the discharge chamber, wherein the partially-constrained support device comprises:

a cup having an inner surface configured to retain a movable apparatus and an outer surface having a first outer diameter; and a plurality of rods arranged at the outer surface of the cup such that the arrangement of the plurality of rods defines a second outer diameter, the second outer diameter greater than the first outer diameter;

wherein an inner surface of the opening of the chamber wall contacts the plurality of rods of the partially-constrained support device when the partially-constrained support device is positioned within the opening, and the outer surface of the cup of the partially-constrained support device does not contact the inner surface of the opening of the chamber wall.

18. The ultraviolet light source of clause 17, wherein:
the support apparatus further comprises a fully-constrained support device comprising a second cup, the second cup comprising an inner surface configured to retain the movable apparatus and an outer surface, and
the fully-constrained support device is positioned within an opening of a second chamber wall of the discharge chamber such that the outer surface of the fully-constrained support device contacts an inner surface of the opening of the second chamber wall.

19. The ultraviolet light source of clause 18, wherein the chamber wall having the partially-constrained support device is positioned opposite to the second chamber wall such that the opening of the chamber wall having the partially-constrained support device is symmetrically placed from the second opening on the second chamber wall.

20. The ultraviolet light source of clause 19, wherein the movable apparatus includes a fan, the fan configured to rotate about an axis of rotation of the fan.

21. The ultraviolet light source of clause 20, wherein the fully-constrained support device is fixed within the second opening of the second chamber wall and the partially-constrained support device is configured to move along the axis of rotation of the fan within the opening of the chamber wall that holds the partially-constrained support device.

22. The ultraviolet light source of clause 17, wherein the chamber walls of the discharge chamber are sealable such that, in operation, the interior cavity is hermetically sealed.

23. The ultraviolet light source of clause 17, further comprising one or more optical components defining an optical pathway, at least part of the optical pathway passing through the discharge chamber via an optical component held by a chamber wall of the discharge chamber.

24. The ultraviolet light source of clause 23, wherein the discharge chamber contains a gas mixture within the interior cavity, the gas mixture including a gain medium, and an energy source configured to supply energy to the gain medium.

25. The ultraviolet light source of clause 24, wherein the optical components include a set of optical elements that form an optical resonator.

26. The ultraviolet light source of clause 17, further comprising another support apparatus associated with another discharge chamber of the light generation apparatus, the other support apparatus configured to hold a movable apparatus extending into the interior cavity of the other discharge chamber, the other support apparatus comprising a partially-constrained support device positioned within an opening of a first chamber wall of the other discharge chamber and a fully-constrained support device fixed within an opening of a second chamber wall of the other discharge chamber.

27. A method of reducing corrosion in a rotary bearing of a light source apparatus, the method comprising:
frictionally engaging a support device within a cylindrically-shaped wall opening of a wall of a gas discharge chamber such that a plurality of axially-extending rods of the support device are contacting an inner surface of the wall opening while a cup of the support device around which the plurality of rods are arranged and retained is not in contact with the inner surface of the wall opening;
retaining a rotary bearing within an inner surface of the cup, the rotary bearing having a bearing axis aligned with the axis of the wall opening; and
engaging a post of a rotatable element that extends into an interior of a chamber through the rotary bearing such that the post is constrained to rotate about the bearing axis;
wherein particles generated from the frictional engagement between the rods and the inner surface of the wall opening exit the space between the rods and the inner surface of the wall opening and enter a volume between an outer surface of the cup and the inner surface of the wall opening.

28. The method of clause 27, further comprising constraining each of the plurality of rods to an outer surface of the cup by press fitting and/or thermally fitting each rod to the outer surface.

29. A light source comprising:
a discharge chamber configured to hold a gaseous gain medium and to produce a light beam,
the discharge chamber comprising chamber walls that define an interior cavity, a first chamber wall holding a first optical element and a second chamber wall holding a second optical element;
a rotatable fan extending through the interior cavity, the rotatable fan configured to circulate the gaseous gain medium within the interior cavity and, in use, the rotatable fan rotating about a fan axis; and
a support apparatus configured to hold the rotatable fan, the support apparatus comprising:
a partially-constrained support device positioned within an opening of a first support chamber wall and receiving a first end of the rotatable fan, the partially-constrained support device able to move along the fan axis; and
a fully-constrained support device fixed within an opening of a second support chamber wall that is opposite the first support chamber wall and receiving a second end of the rotatable fan.

30. The light source of clause 29, wherein the partially-constrained support device comprises:
a cup having an inner surface configured to retain a bearing and an outer surface having a first outer diameter; and
a plurality of rods arranged at the outer surface of the cup such that the arrangement of the plurality of rods defines a second outer diameter, the second outer diameter greater than the first outer diameter;

wherein an inner surface of the opening of the first support chamber wall contacts the plurality of rods when the partially-constrained support device is positioned within the opening of the first support chamber wall, and the outer surface of the cup does not contact the inner surface of the opening of the first support chamber wall.

31. The light source of clause 29, wherein the fully-constrained support device comprises a second cup, the second cup comprising an inner surface configured to retain a bearing, and an outer surface, and the fully-constrained support device is positioned within the opening of a second support chamber wall such that the outer surface of the fully-constrained support device contacts an inner surface of the opening of the second support chamber wall.

32. A light source apparatus comprising:

a chamber comprising a chamber wall defining an opening; and a support apparatus comprising a support device positioned within the opening of the chamber wall, the support device defining an inner surface configured to retain a bearing and an outer surface having a first outer diameter and a plurality of raised ridges arranged at the outer surface such that the arrangement of the raised edges defines a second outer diameter, the second outer diameter greater than the first outer diameter and a surface area of the raised edges being smaller than a surface area of the outer surface; and wherein the chamber wall is configured to hold the support device such that the chamber wall contacts the raised edges when the support device is positioned within the opening of the chamber wall, and the outer surface does not contact the chamber wall.

33. The light source apparatus of clause 32, wherein each raised edge is formed from an elongated rod that is constrained to the outer surface of the support device.

34. The light source apparatus of clause 32, wherein each of the plurality of raised ridges comprises a hardened material.

35. The light source apparatus of clause 34, wherein the material is hardened, polished steel.

Other implementations are within the scope of the following claims.

What is claimed is:

1. A light source apparatus comprising:
a chamber comprising a chamber wall defining an opening; and
a support apparatus comprising a support device positioned within the opening of the chamber wall, the support device comprising:
    a cup having an inner surface configured to retain a movable apparatus and an outer surface having a first outer diameter; and
    a plurality of rods arranged at the outer surface of the cup along the length of the cup, such that the arrangement of the plurality of rods defines a second outer diameter, the second outer diameter greater than the first outer diameter; and
wherein the chamber wall is configured to hold the support device such that the chamber wall contacts the plurality of rods when the support device is positioned within the opening of the chamber wall, and the outer surface of the cup does not contact the chamber wall.

2. The light source apparatus of claim 1, wherein the movable apparatus comprises a bearing configured to be retained within the inner surface of the cup.

3. The light source apparatus of claim 2, wherein the bearing is a ball bearing.

4. The light source apparatus of claim 2, wherein the bearing is configured to receive a post of a rotatable fan, the opening is cylindrical, and the axis of rotation of the fan is parallel with the axis of the opening.

5. The light source apparatus of claim 1, wherein the movable apparatus comprises a rotatable fan.

6. The light source apparatus of claim 5, wherein the opening extends through the chamber wall and the rotatable fan is disposed inside the chamber.

7. The light source apparatus of claim 1, wherein the outer surface of the cup further comprises a plurality of holes, each of the holes configured to receive a respective one of the plurality of rods.

8. The light source apparatus of claim 1, wherein the plurality of rods includes three rods, each rod placed 120 degrees from each of the other rods about the outer surface of the cup.

9. The light source apparatus of claim 1, wherein each of the plurality of rods comprises hardened, polished steel.

10. The light source apparatus of claim 1, wherein the support device is configured to freely move in a first direction within the opening of the chamber wall, the first direction parallel to an axis of the opening.

11. The light source apparatus of claim 1, wherein a distance between the first outer diameter of the outer surface of the cup and the second outer diameter defined by the plurality of rods is greater than a diameter of each of particles generated from the frictional engagement between the rods and an inner surface of the opening of the chamber wall.

12. The light source apparatus of claim 11, wherein the distance between the first outer diameter and the second outer diameter is within a range of about 100 to about 4000 micrometers.

13. The light source apparatus of claim 1, wherein the opening is cylindrically shaped, the cup is cylindrically shaped, and the rods are disposed parallel to a cylindrical axis of the cup such that the support device is configured to freely move in a direction within the opening that is parallel to an axis of the opening.

14. The light source apparatus of claim 1, wherein the support apparatus further comprises a constrained support device fixed within an opening of a second chamber wall of the chamber.

15. The light source apparatus of claim 14, wherein the constrained support device comprises a second cup comprising an inner surface configured to retain the movable apparatus and an outer surface, and wherein the opening of the second chamber wall is configured to hold the second cup such that the second chamber wall contacts the outer surface of the second cup when the second cup is positioned within the opening of the second chamber wall.

16. The light source apparatus of claim 1, wherein each of the plurality of rods is constrained to the outer surface of the cup.

17. An ultraviolet light source comprising:
a light generation apparatus comprising at least one discharge chamber configured to hold a gaseous gain medium and to produce a light beam, each of the at least one discharge chambers comprising chamber walls that define an interior cavity; and a support apparatus comprising a partially-constrained support device associated with a discharge chamber and positioned within an opening of one of the chamber walls of the discharge chamber, wherein the partially-constrained support device comprises:
  a cup having an inner surface configured to retain a movable apparatus and an outer surface having a first outer diameter; and
  a plurality of rods arranged at the outer surface of the cup along the length of the cup, such that the arrangement of the plurality of rods defines a second outer diameter, the second outer diameter greater than the first outer diameter;
wherein an inner surface of the opening of the chamber wall contacts the plurality of rods of the partially-constrained support device when the partially-constrained support device is positioned within the opening, and the outer surface of the cup of the partially-constrained support device does not contact the inner surface of the opening of the chamber wall.

18. The ultraviolet light source of claim 17, wherein:
the support apparatus further comprises a fully-constrained support device comprising a second cup, the second cup comprising an inner surface configured to retain the movable apparatus and an outer surface, and
the fully-constrained support device is positioned within an opening of a second chamber wall of the discharge chamber such that the outer surface of the fully-constrained support device contacts an inner surface of the opening of the second chamber wall.

19. The ultraviolet light source of claim 18, wherein the chamber wall having the partially-constrained support device is positioned opposite to the second chamber wall such that the opening of the chamber wall having the partially-constrained support device is symmetrically placed from the opening of the second chamber wall.

20. The ultraviolet light source of claim 19, wherein the movable apparatus includes a fan, the fan configured to rotate about an axis of rotation of the fan.

21. The ultraviolet light source of claim 20, wherein the fully-constrained support device is fixed within the opening of the second chamber wall and the partially-constrained support device is configured to move along the axis of rotation of the fan within the opening of the chamber wall that holds the partially-constrained support device.

22. The ultraviolet light source of claim 17, wherein the chamber walls of the discharge chamber are sealable such that, in operation, the interior cavity is hermetically sealed.

23. The ultraviolet light source of claim 17, further comprising one or more optical components defining an optical pathway, at least part of the optical pathway passing through the discharge chamber via an optical component held by a chamber wall of the discharge chamber.

24. The ultraviolet light source of claim 23, wherein the discharge chamber contains a gas mixture within the interior cavity, the gas mixture including a gain medium, and an energy source configured to supply energy to the gain medium.

25. The ultraviolet light source of claim 24, wherein the optical components include a set of optical elements that form an optical resonator.

26. The ultraviolet light source of claim 17, further comprising another support apparatus associated with another discharge chamber of the light generation apparatus, the other support apparatus configured to hold a movable apparatus extending into the interior cavity of the other discharge chamber, the other support apparatus comprising a partially-constrained support device positioned within an opening of a first chamber wall of the other discharge chamber and a fully-constrained support device fixed within an opening of a second chamber wall of the other discharge chamber.

27. A light source comprising:
a discharge chamber configured to hold a gaseous gain medium and to produce a light beam, the discharge chamber comprising chamber walls that define an interior cavity, a first chamber wall holding a first optical element and a second chamber wall holding a second optical element;
a rotatable fan extending through the interior cavity, the rotatable fan configured to circulate the gaseous gain medium within the interior cavity and, in use, the rotatable fan rotating about a fan axis; and
a support apparatus configured to hold the rotatable fan, the support apparatus comprising:
  a partially-constrained support device positioned within an opening of a first support chamber wall and receiving a first end of the rotatable fan, the partially-constrained support device able to move along the fan axis; and
  a fully-constrained support device fixed within an opening of a second support chamber wall that is opposite the first support chamber wall and receiving a second end of the rotatable fan.

28. The light source of claim 27, wherein the partially-constrained support device comprises:
  a cup having an inner surface configured to retain a bearing and an outer surface having a first outer diameter; and
  a plurality of rods arranged at the outer surface of the cup such that the arrangement of the plurality of rods defines a second outer diameter, the second outer diameter greater than the first outer diameter;
wherein an inner surface of the opening of the first support chamber wall contacts the plurality of rods when the partially-constrained support device is positioned within the opening of the first support chamber wall, and the outer surface of the cup does not contact the inner surface of the opening of the first support chamber wall.

29. The light source of claim 27, wherein the fully-constrained support device comprises a second cup, the second cup comprising an inner surface configured to retain a bearing, and an outer surface, and the fully-constrained support device is positioned within the opening of a second support chamber wall such that the outer surface of the fully-constrained support device contacts an inner surface of the opening of the second support chamber wall.

30. A light source apparatus comprising:
a chamber comprising a chamber wall defining an opening; and
a support apparatus comprising a support device positioned within the opening of the chamber wall, the support device defining an inner surface configured to retain a bearing and an outer surface having a first outer diameter and a plurality of raised ridges arranged at the outer surface along the length of the support device, such that the arrangement of the raised edges defines a second outer diameter, the second outer diameter greater than the first outer diameter and a surface area of the raised edges being smaller than a surface area of the outer surface;
wherein the chamber wall is configured to hold the support device such that the chamber wall contacts the raised edges when the support device is positioned within the opening of the chamber wall, and the outer surface does not contact the chamber wall.

31. The light source apparatus of claim 30, wherein each raised edge is formed from an elongated rod that is constrained to the outer surface of the support device.

32. The light source apparatus of claim 30, wherein each of the plurality of raised ridges comprises a hardened material.

33. The light source apparatus of claim 32, wherein the material is hardened, polished steel.

\* \* \* \* \*